US010252470B2

(12) United States Patent
Noelting et al.

(10) Patent No.: US 10,252,470 B2
(45) Date of Patent: Apr. 9, 2019

(54) AUTOMATED EDGE BAND APPLICATION FOR NON-LINEAR WORK PIECES

(71) Applicant: GFYED, LLC., Bowlus, MN (US)

(72) Inventors: Michael J. Noelting, Bowlus, MN (US); Craig W. Sexton, Rice, MN (US); Michael S. Marquette, Melrose, MN (US); Travis M. Marquette, Waite Park, MN (US)

( * ) Notice: Subject to any disclaimer, the term of this patent is extended or adjusted under 35 U.S.C. 154(b) by 386 days.

(21) Appl. No.: 14/990,788

(22) Filed: Jan. 7, 2016

(65) Prior Publication Data

US 2016/0193780 A1    Jul. 7, 2016

(51) Int. Cl.
  *B29C 64/00* (2017.01)
  *B27D 5/00* (2006.01)
  *B29C 65/48* (2006.01)
  *B29C 65/00* (2006.01)

(52) U.S. Cl.
  CPC .............. *B29C 65/48* (2013.01); *B27D 5/003* (2013.01); *B27D 5/006* (2013.01); *B29C 66/022* (2013.01); *B29C 66/80* (2013.01); *Y10T 156/1007* (2015.01); *Y10T 156/1062* (2015.01); *Y10T 156/1085* (2015.01); *Y10T 156/1734* (2015.01); *Y10T 156/1741* (2015.01); *Y10T 156/1768* (2015.01); *Y10T 156/1776* (2015.01)

(58) Field of Classification Search
  None
  See application file for complete search history.

(56) References Cited

U.S. PATENT DOCUMENTS

| 2,705,820 A | 4/1955 | Torrence |
| 2,748,046 A | 5/1956 | Works et al. |
| 3,468,741 A | 9/1969 | Miller et al. |
| 3,473,988 A * | 10/1969 | Drouet ............... B29C 63/0039 156/107 |
| 3,590,754 A | 7/1971 | Jakobsen |
| 3,626,806 A | 12/1971 | Fritz |
| 3,655,479 A | 4/1972 | Helmes et al. |
| 3,753,832 A | 8/1973 | Veneziale |

(Continued)

FOREIGN PATENT DOCUMENTS

| DE | 199 44 526 A1 | 4/2001 |
| DE | 103 42 723 A1 | 8/2005 |

(Continued)

*Primary Examiner* — Linda L Gray
(74) *Attorney, Agent, or Firm* — Albert W. Watkins

(57) ABSTRACT

An automated edge band application machine has a board drive assembly and an opposed caster wheel that together capture and move a work piece edge into engagement with a rotating roller banding guide with edge banding captured between. An adhesive affixes the edge banding to the work piece responsive thereto. An edging detector is located along the path of the work piece edge, in a position in advance of the board drive assembly, and is configured to detect a presence of edge band on the edge of the work piece. When the edging detector detects edging, or at a precise distance along the edge band thereafter, a cutting die assembly severs the edge band. The board drive assembly automatically adjusts to varying thickness work pieces, engages with a work piece major surface, and rotates in synchrony with a drive spindle assembly and the rotating roller banding guide.

9 Claims, 34 Drawing Sheets

(56) References Cited

U.S. PATENT DOCUMENTS

| | | | |
|---|---|---|---|
| 4,067,762 A | 1/1978 | Rhoads |
| 4,222,812 A | 9/1980 | Duewel |
| 4,503,780 A | 3/1985 | Apissomian |
| 4,558,553 A | 12/1985 | Kolk |
| 5,312,504 A | 5/1994 | Jorde |
| 5,440,857 A | 8/1995 | Shanok et al. |
| 5,525,384 A | 6/1996 | Gilmore et al. |
| 5,693,174 A | 12/1997 | Nakata et al. |
| 6,098,688 A | 8/2000 | Darovic |
| 6,263,938 B1 | 7/2001 | Maioli et al. |
| 7,189,442 B1 | 3/2007 | Jesse et al. |
| 7,582,179 B2 | 9/2009 | Jesse et al. |
| 8,430,144 B2 | 4/2013 | Lin |
| 8,443,858 B2 | 5/2013 | Lin |

FOREIGN PATENT DOCUMENTS

| | | | | |
|---|---|---|---|---|
| EP | 2181799 A1 | * | 5/2010 | ............... B24B 9/18 |
| EP | 2527110 A1 | | 11/2012 | |

\* cited by examiner

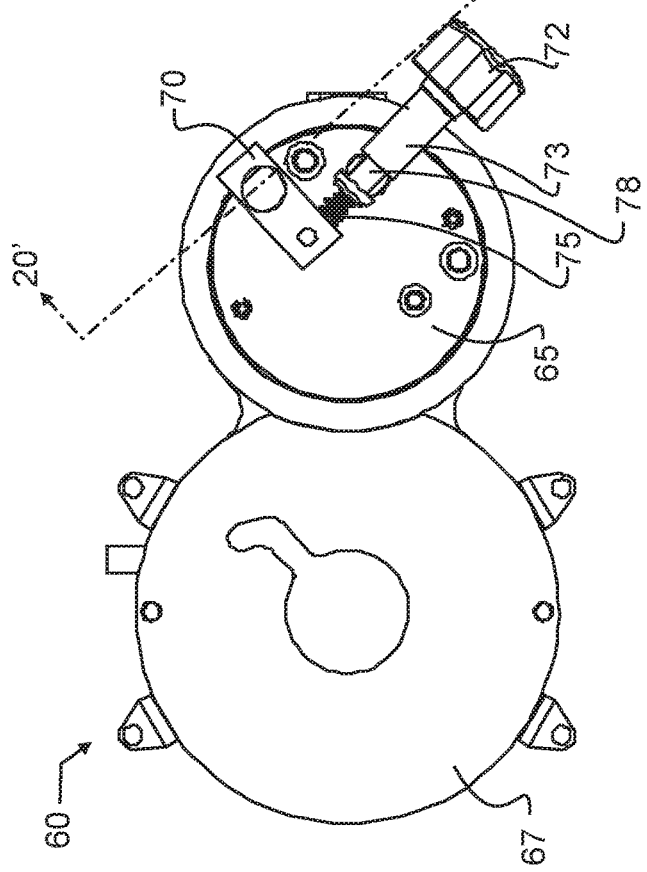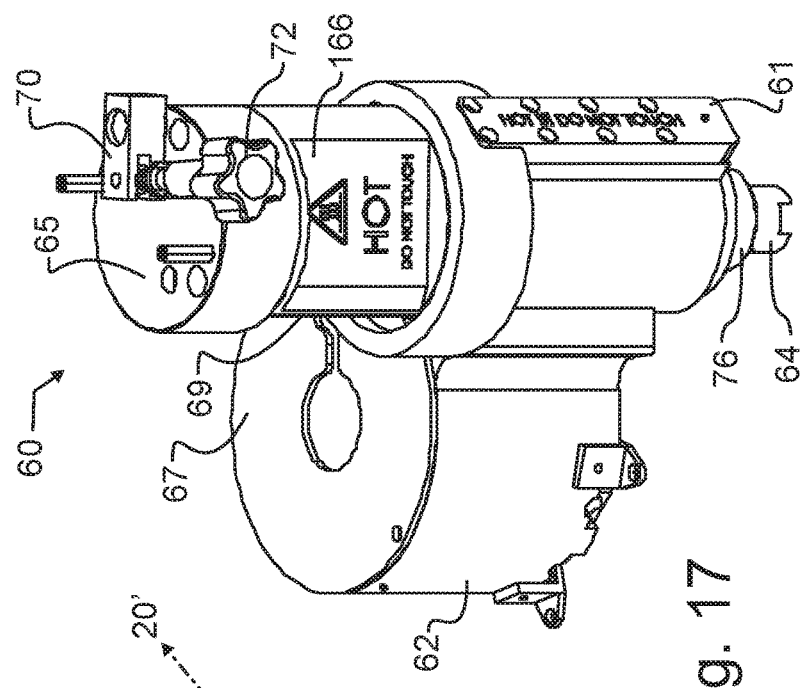
Fig. 16
Fig. 17

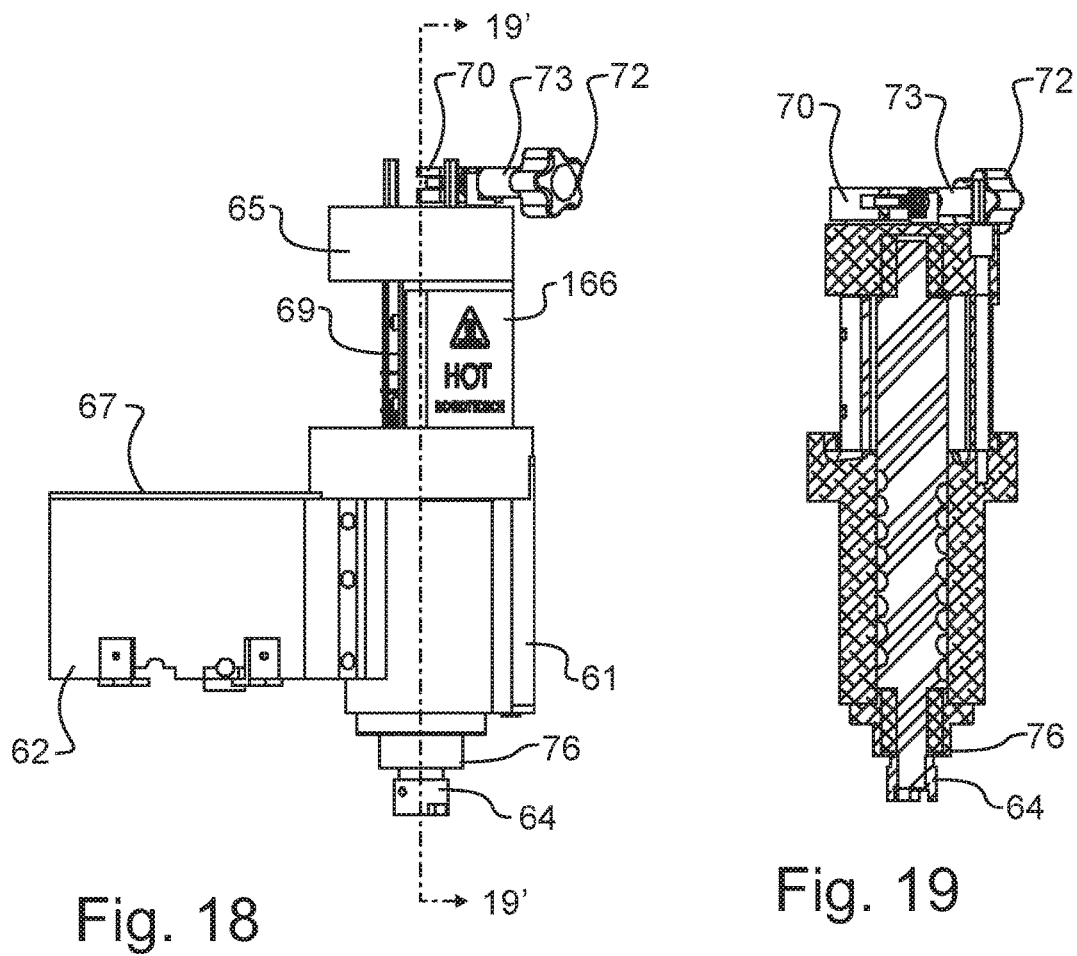
Fig. 18
Fig. 19
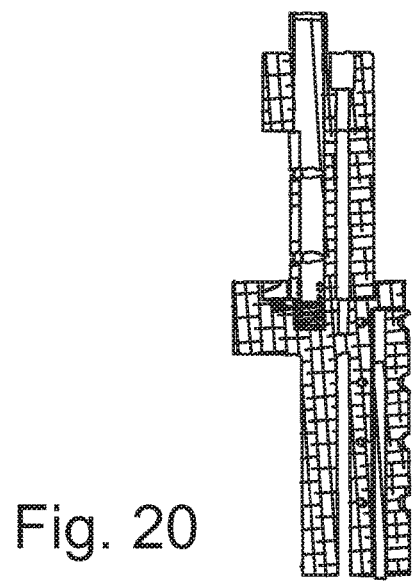
Fig. 20

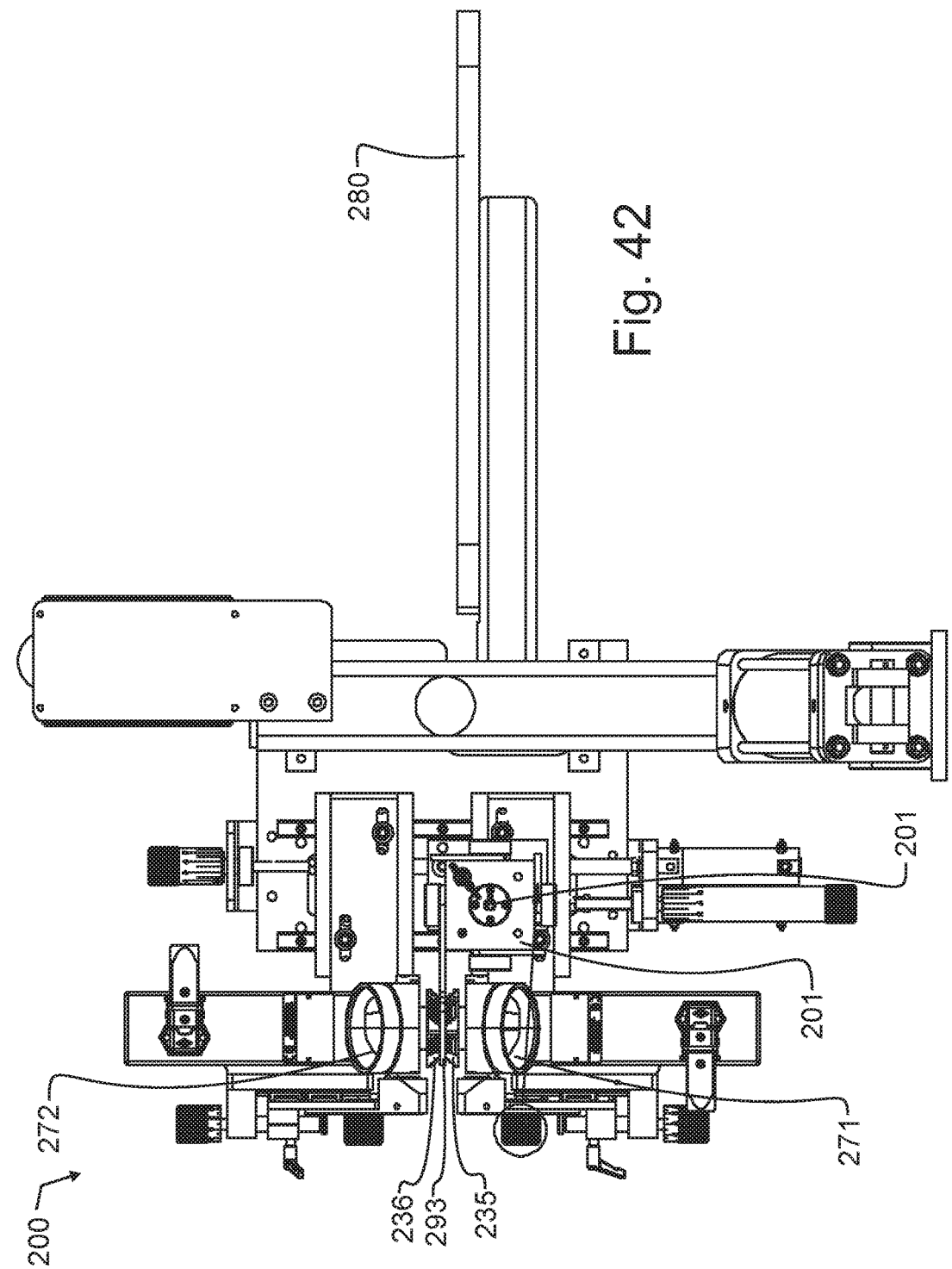

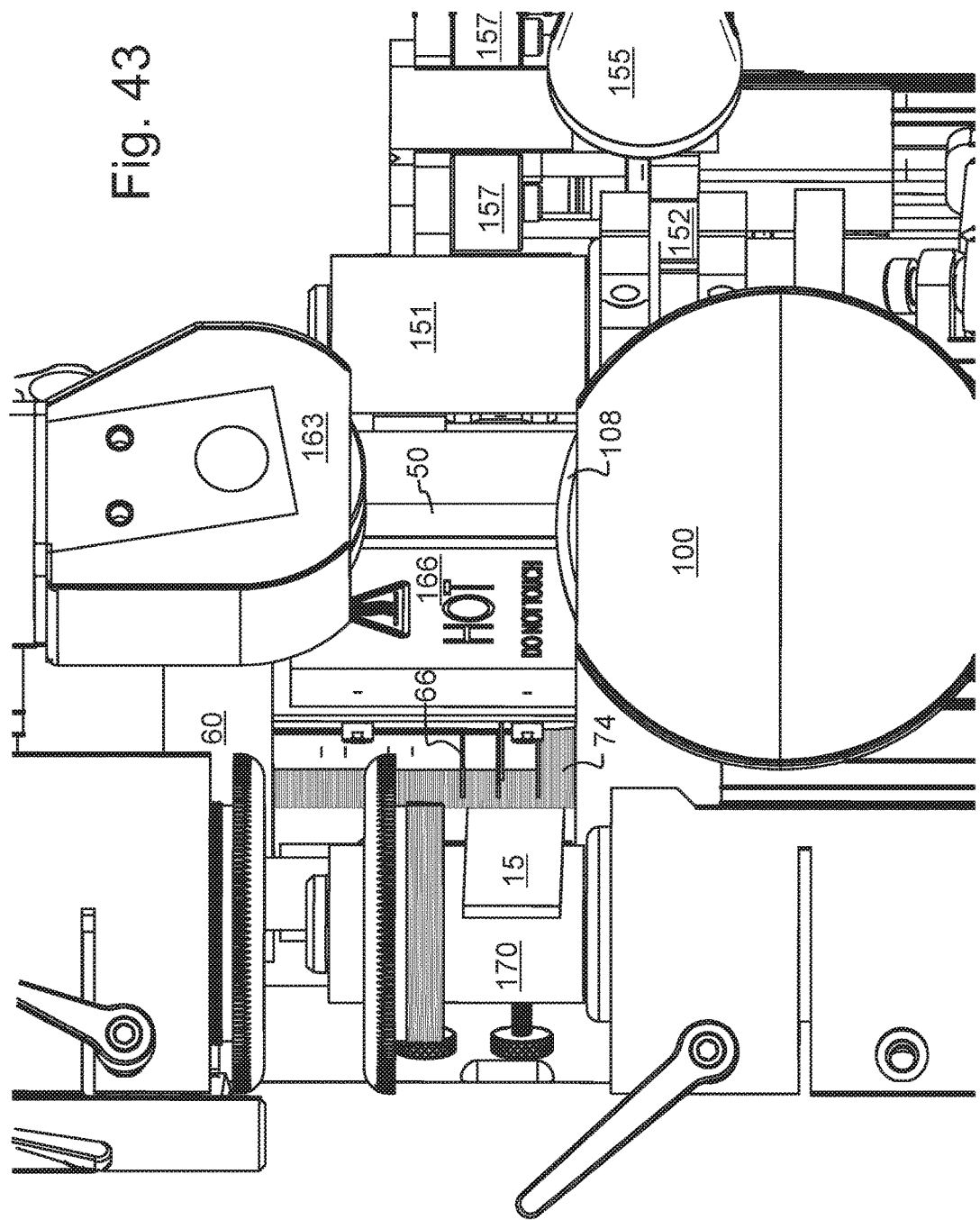

AUTOMATED EDGE BAND APPLICATION FOR NON-LINEAR WORK PIECES

CROSS REFERENCE TO RELATED APPLICATIONS

The present application claims the benefit of U.S. provisional patent application 62/100,868 filed Jan. 7, 2015 of like title and having common inventors, the teachings and entire contents which are incorporated herein by reference.

BACKGROUND OF THE INVENTION

1. Field of the Invention

This inventions pertains generally to adhesive bonding and miscellaneous chemical manufacture, and more particularly to a surface bonding and assembly machine that wraps an indefinite running length flexible web onto a part. In one particular manifestation, the invention is an automated edge band applicator that precisely wraps both linear and non-linear work pieces. The machine severs the edge band from a spool to exactly wrap a part, independent of part-to-part variances.

2. Description of the Related Art

In the fabrication of various tables, shelving, other furniture, and a wide variety of other diverse objects, laminated material is often used, where major surfaces are often comprised of a thin lamina having a desired finish, decorative appearance, resistance to soiling, or the like. These major surfaces often conceal the underlying substrate, which might for exemplary purpose comprise a Medium Density Fiberboard (MDF) or other wood product or wood substitute. In such case, and without further finishing, the edges will betray the otherwise concealed MDF. Furthermore, these edges will often also be less durable, and easily damaged. Likewise, some wood products are produced with cut edges that are unfinished, porous, irregular or the like.

To attain the desired finish, appearance, durability and the like, the edges may be covered with strips or bands of decorative and durable material. Often this edge band is formed through a plastic extrusion process, and the band after extrusion and cooling is wrapped about or into a spool. This edge band will most preferably be wrapped to precisely encompass the edge of the object, neither overlapping nor leaving an unconcealed gap. Overlap will create an unsightly protrusion that is also more likely to be separated from the object. A gap is also unsightly, and while less likely to be separated, still presents a distinct edge that might accidentally be snagged, undesirably placing great force and stress on the adhesion between the edge band and underlying substrate. Heretofore, the precision required to neither overlap nor leave a gap has not been attainable with affordable automated machinery. Particularly troublesome are non-linear edges such as are found on oval table tops and other artistic and decorative shapes, since typical manufacturing tolerance variations will lead to shorter or longer distances along the non-linear edge. This means that simply measuring a predetermined length of banding material will not ensure precise lapping of the ends of the edge banding. Instead, and particularly with non-rectilinear work pieces, substantial manual labor has been required in the prior art to sever and secure the edge band.

Another challenge to automated banding has been associated with the edge band material. Depending upon the product, edge banding may be of diverse and sometimes inconsistent dimension. For exemplary purposes, some banding is quite thick, measuring 3 millimeters in thickness, while other banding is only one-half millimeter thick. As noted, there will also be tolerance based variation in these thicknesses, as well. The work piece thickness, which may dictate the width of the edge banding, might for exemplary purposes range from 10 to 60 millimeters. The design of an automated edge banding machine capable of handling the wide range of dimensions of edge banding used in the industry has been a stumbling point for much of the prior art.

A number of US patents, the teachings and content which are incorporated herein by reference, are exemplary of the existing edge banding machines and processes: U.S. Pat. No. 2,748,046 by Works et al, entitled "Method of edge-surfacing woody products"; U.S. Pat. No. 3,468,741 by Miller et al, entitled "Apparatus for applying edging tape to the edge of a workpiece"; U.S. Pat. No. 3,626,806 by Fritz, entitled "Protective and decorative edging"; U.S. Pat. No. 3,655,479 by Helmes et al, entitled "Method for gluing a strip of material against the side of a flat work piece, like a table leaf, and a device for peforming this method"; U.S. Pat. No. 3,753,832 by Veneziale, entitled "Edge banding machine"; U.S. Pat. No. 4,067,762 by Rhoads, entitled "Portable edge bander"; U.S. Pat. No. 4,222,812 by Duewel, entitled "Hot air edge banding machine"; U.S. Pat. No. 5,312,504 by Jorde, entitled "Edge veneering"; U.S. Pat. No. 5,693,174 by Nakata et al, entitled "Apparatus for attaching a molding"; U.S. Pat. No. 6,098,688 by Darovic, entitled "Device for improving an edgebanding machine"; U.S. Pat. No. 6,263,938 by Maioli et al, entitled "Panel edge banding device"; U.S. Pat. No. 7,189,442 by Jesse et al, entitled "Edge band and edge banding process"; U.S. Pat. No. 7,582,179 by Jesse et al, entitled "Edge band and edge banding process"; U.S. Pat. No. 8,430,144 by Lin, entitled "Edge banding machine"; and U.S. Pat. No. 8,443,858 by Lin, entitled "Edge banding machine".

Other US patents, the teachings and content which are incorporated herein by reference, are exemplary of prior art edge bands: U.S. Pat. No. 2,705,820 by Torrence, entitled "Molding strip"; U.S. Pat. No. 3,590,754 by Jakobsen, entitled "Edge bandings for articles of furniture"; U.S. Pat. No. 4,503,780 by Apissomian, entitled "Table with resilient edge"; U.S. Pat. No. 4,558,553 by Kolk, entitled "Furniture article with edge molding"; U.S. Pat. No. 5,440,857 by Shanok et al, entitled "Endless edge trim fabricated from an extruded profile"; and U.S. Pat. No. 5,525,384 by Gilmore et al, entitled "Flexible molding strip having inserted decorative cord and furniture provided with such strips".

In addition to the foregoing patents, Webster's New Universal Unabridged Dictionary, Second Edition copyright 1983, is incorporated herein by reference in entirety for the definitions of words and terms used herein.

SUMMARY OF THE INVENTION

In a first manifestation, the invention is an automated edge band application machine. A board drive assembly moves a work piece into engagement with a rotating roller banding guide and with edge banding captured between. An adhesive affixes the edge banding to the work piece responsive to said capturing. An edging detector is located along the path of the work piece edge, in a position in advance of the board drive assembly, and is configured to detect a presence of edge band on the edge of the work piece. When the edging detector detects edging, or at a precise or at a precise distance along the edge band thereafter, a cutting die assembly severs the edge band.

In a second manifestation, the invention is a board drive assembly operative within an automated edge band application machine to automatically adjust to a varying thickness of work piece, engage with a work piece major surface, and rotate to drive the work piece towards a roller banding guide.

In a third manifestation, the invention is an edging application cell configured to apply edge banding to the edge of a generally planar work piece. The edging application cell has a position encoder assembly configured to measure a longitudinal distance of the edge banding passing adjacent to the position encoder assembly, a drive spindle assembly in rotating engagement with the edge banding, a cutting die assembly configured to sever a length of edge banding, an adhesive applicator configured to apply an adhesive to the edge banding, a roller banding guide, and a board drive assembly configured to engage a work piece and drive the work piece toward the roller banding guide, the drive spindle assembly, roller banding guide, and board drive assembly all driven by a single motive source through fixed transmission, whereby each of the drive spindle assembly, roller banding guide, and board drive assembly turn in synchrony.

In a fourth manifestation, the invention is an edge band trimmer having a first cutter and a second cutter spaced from and opposed to the first cutter, thereby defining a gap between the first and second cutters. A turret has a plurality of rules affixed thereto, each of said plurality of rules pivotal with respect to the turret from a retracted position to a working position. The turret is rotatable about a turret axis, and through rotation about the turret axis selects which one of said plurality of rules will pivot into the gap between the first and second cutters.

In a fifth manifestation, the invention is an edge band trimmer having a first cutter and a second cutter spaced from and opposed to the first cutter, thereby defining a gap between the first and second cutters. A first dust collection manifold has a cylindrical opening adjacent to and generally encompassing the first cutter. A second dust collection manifold has a cylindrical opening adjacent to and generally encompassing the second cutter.

In a sixth manifestation, the invention is a cutting die assembly configured to cut edging within an automated edge band application machine. A plurality of edging guides guide edge band along a longitudinal path. The cutting die is offset from perpendicular to the longitudinal path, and will thereby sever the edge band at an angle offset from perpendicular to the longitudinal path. A board drive assembly moves a work piece into engagement with a rotating roller banding guide and with edge banding captured between. An adhesive affixes the edge banding to the work piece responsive to said capturing. An edging detector is located along the path of the work piece edge, in a position in advance of the board drive assembly, and is configured to detect a presence of edge band on the edge of the work piece. When the edging detector detects edging, or at a precise or at a precise distance along the edge band thereafter, a cutting die assembly severs the edge band.

In a seventh manifestation, the invention is an edging application cell having an edge band inlet configured to receive edge band from a source spool. A plurality of edging guides guide edge band along a longitudinal path. A roller defines an axis of rotation and pinches the edge band against an opposed surface defining a generally planar surface. The roller axis of rotation is offset from parallel to the generally planar surface by a minor amount sufficient to bias the edge band into contact with the plurality of edging guides.

OBJECTS OF THE INVENTION

The present invention and the preferred and alternative embodiments have been developed with a number of objectives in mind. While it is possible that not all of these objectives are found in every embodiment, these objectives nevertheless provide a sense of the general intent and the many possible benefits that are available from embodiments of the present invention.

A first object of the invention is to provide an apparatus operable to apply edge band to a work piece. A second object of the invention is to apply a precise length of edge band to match the perimeter of the work piece, independent of dimensional variations found in the work piece. Another object of the present invention is to eliminate the readily visible seam between the start and finish of the edge band. A further object of the invention is to ensure precision placement of the edge band that is much more rapid using the present invention than possible using techniques of the prior art. Another object of the present invention is to accommodate a wide dimensional range of work pieces and edge banding. An additional object of the invention is to provide all edging operations within a single machine apparatus. Yet another object of the invention is to provide efficient removal of ground material from an edging grinding operation.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which:

FIGS. 15-20 illustrate a preferred embodiment glue pot assembly used in the preferred embodiment edge band application machine of FIG. 1 from front projected, top, side projected, side elevational, sectional view along a vertical plane illustrated by section line 19', and sectional view along a vertical plane illustrated by section line 20', respectively.

FIGS. 39-42 depict a preferred embodiment grinder used in the preferred embodiment edge band application machine of FIG. 1 from right side elevational, front and slightly left projected, front and left side elevational, and front elevational views, respectively.

FIG. 43 illustrates the preferred embodiment edging application cell of FIGS. 11 and 12 from a front elevational view, enlarged to illustrate in the vicinity of the edging passing in contact with the glue pot and roller banding guide.

DESCRIPTION OF THE PREFERRED EMBODIMENT

Figure 1:
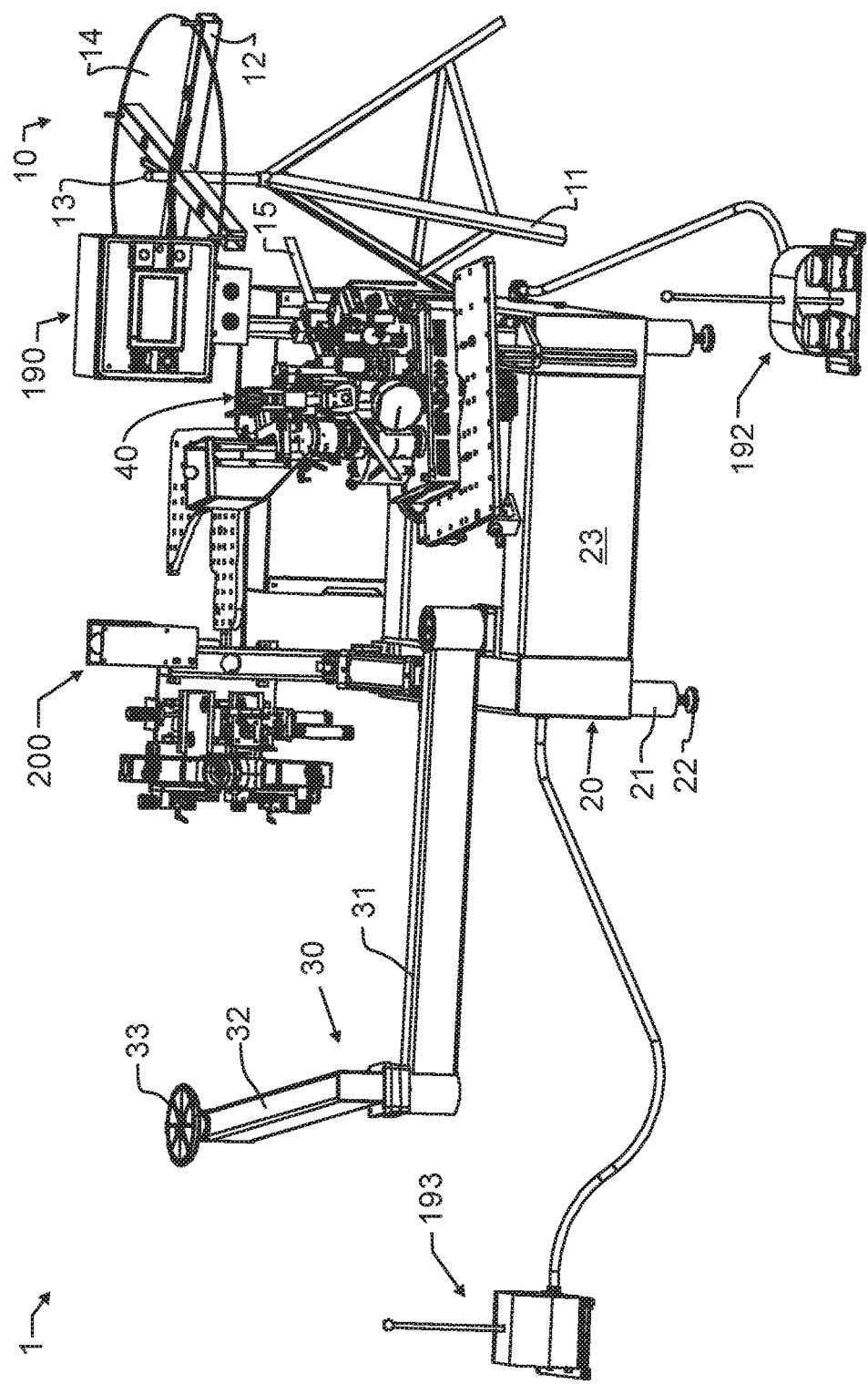
FIG. 1 illustrates a preferred embodiment automated edge band application machine designed in accord with the teachings of the present invention from a front and slightly elevated projected view.
Figure 2:
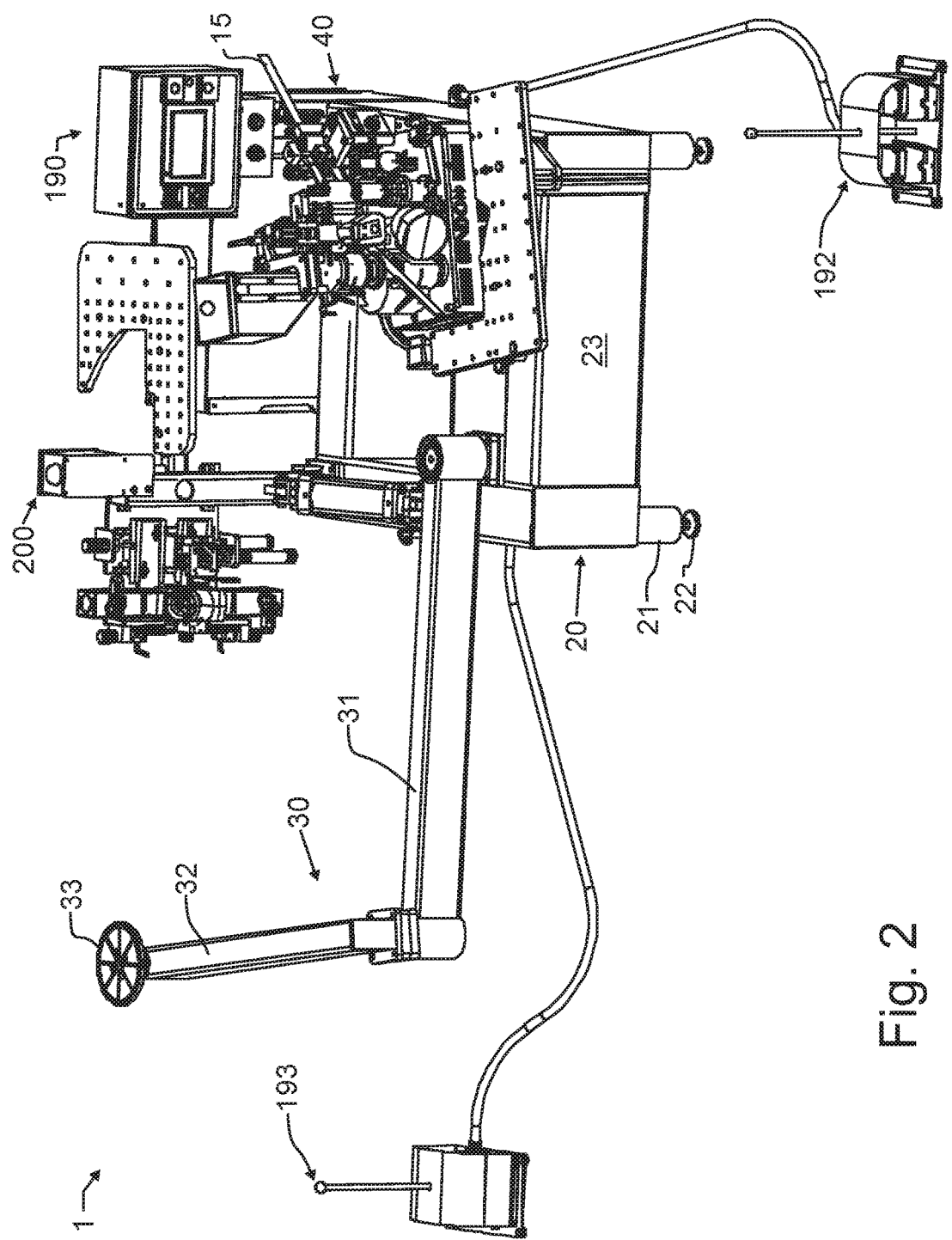
FIG. 2 illustrates the preferred embodiment edge band application machine of FIG. 1 from a projected view of approximately the same orientation, but without the edge band dispensing table.
Figure 3:
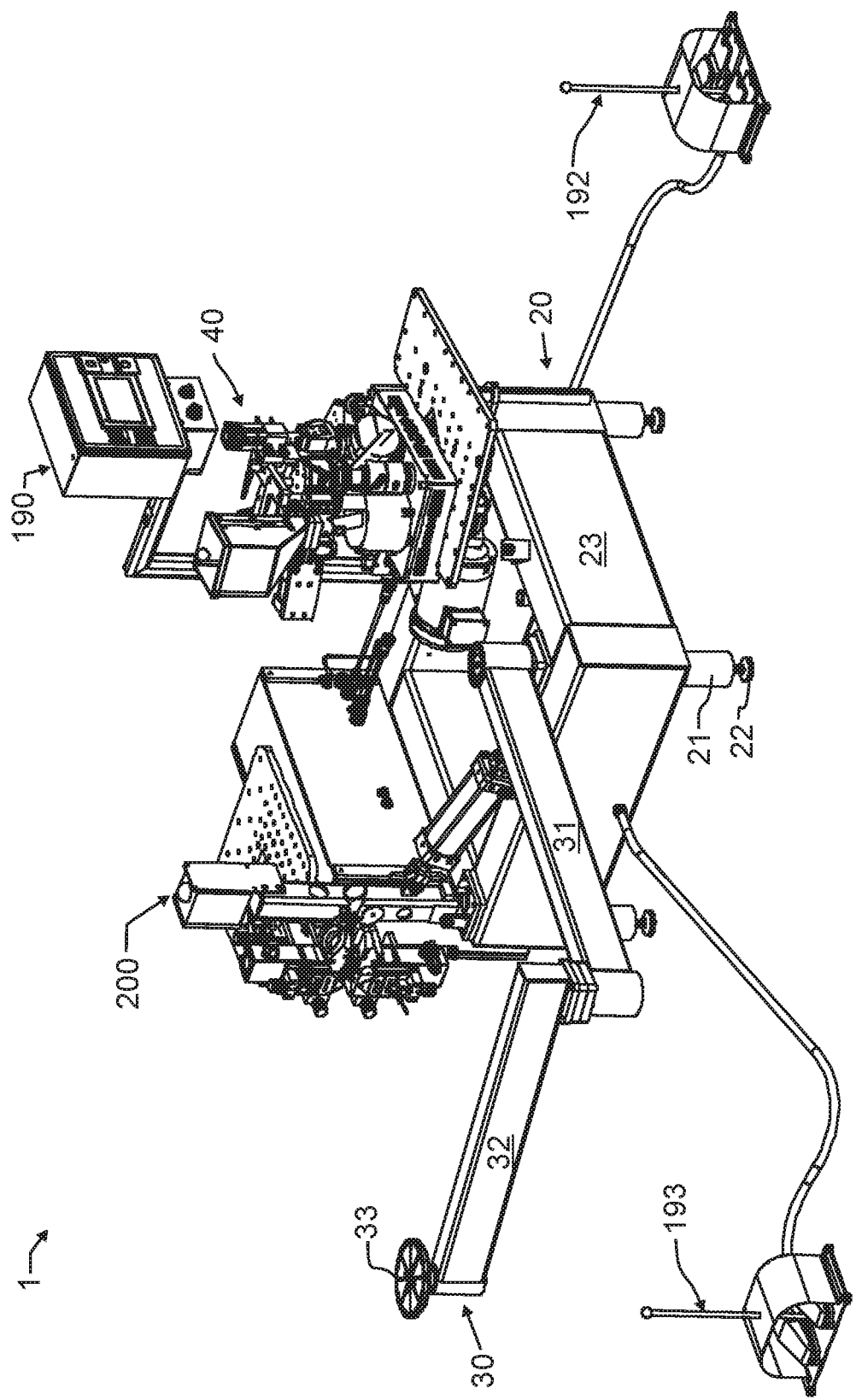
FIG. 3 illustrates the preferred embodiment edge band application machine of FIG. 1 from a projected view taken from the left side, front, and top side.
Figure 4:
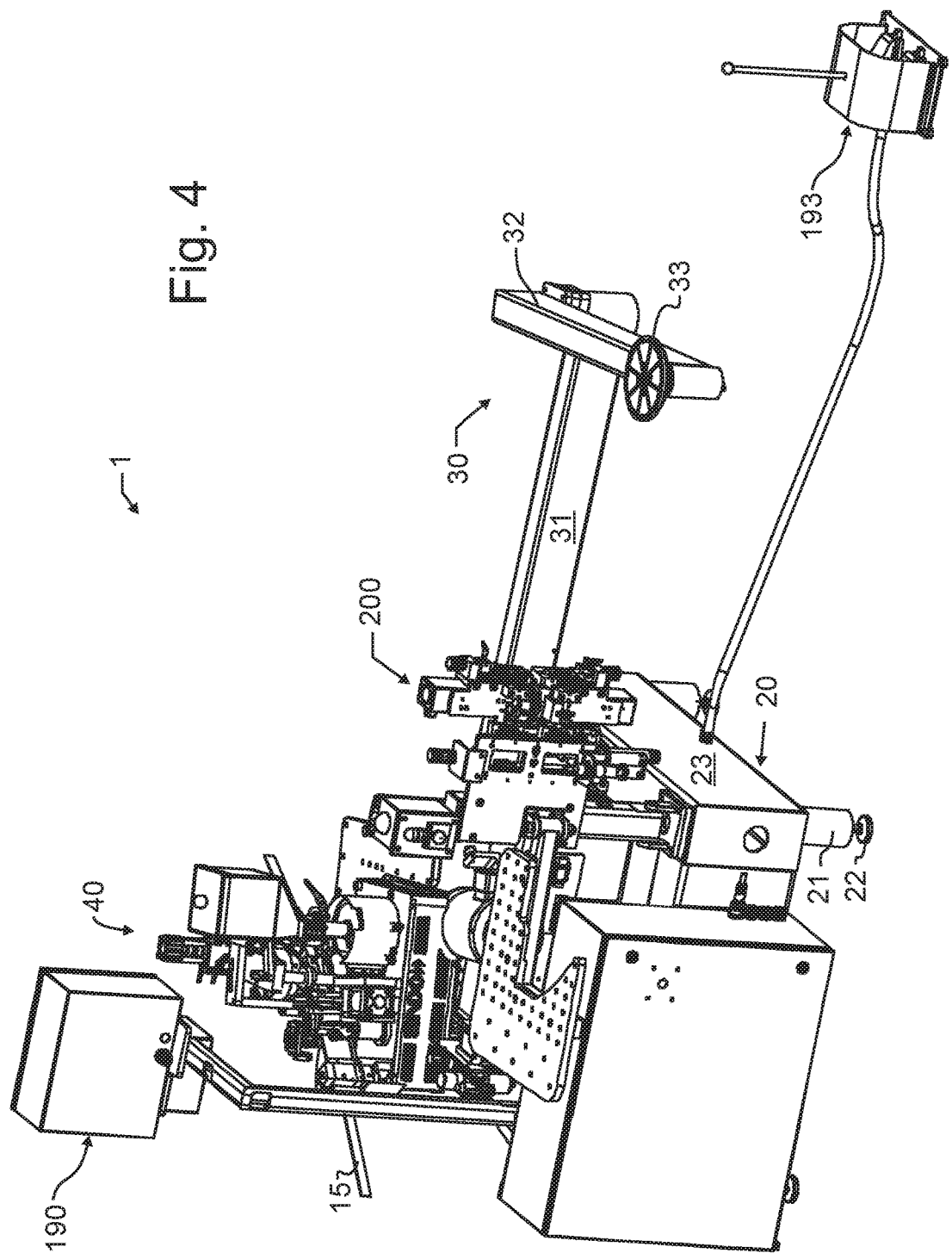
FIG. 4 illustrates the preferred embodiment edge band application machine of FIG. 1 from a projected view taken from the left side, rear, and top side.
Figure 5:
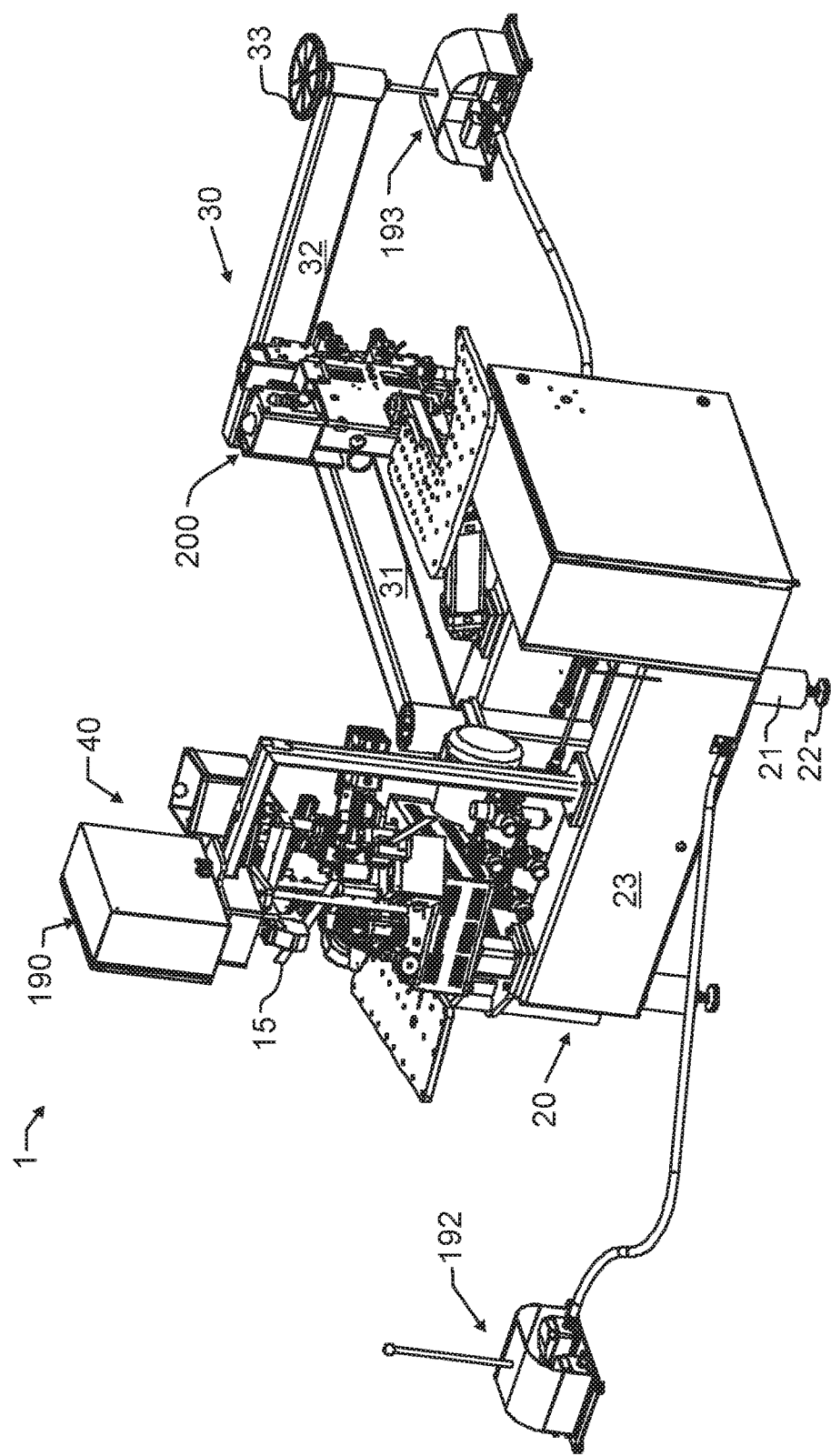
FIG. 5 illustrates the preferred embodiment edge band application machine of FIG. 1 from a projected view taken from the right side, rear, and top side.
Figure 6:
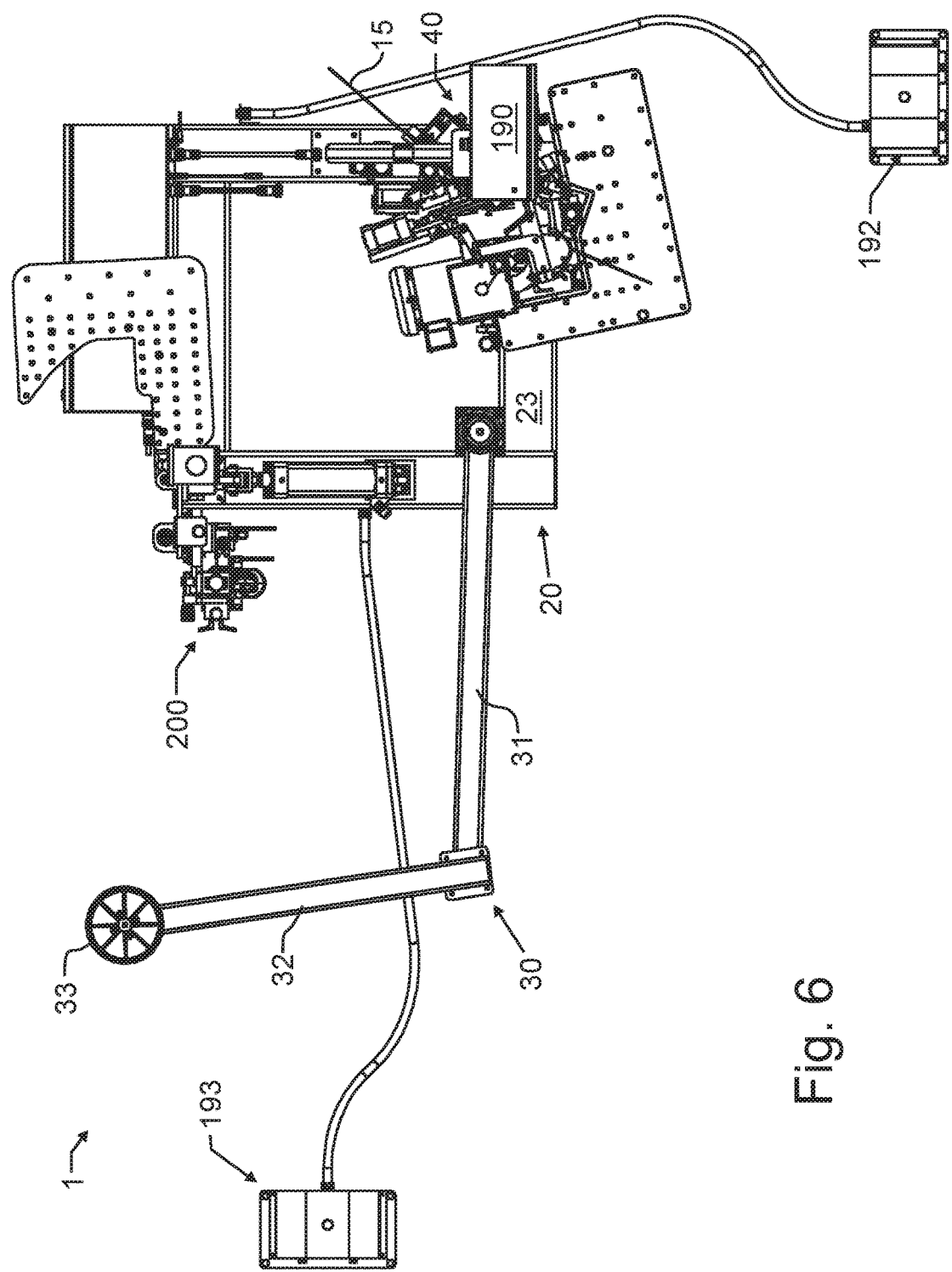
FIG. 6 illustrates the preferred embodiment edge band application machine of FIG. 1 from a top plan view.
Figure 7:
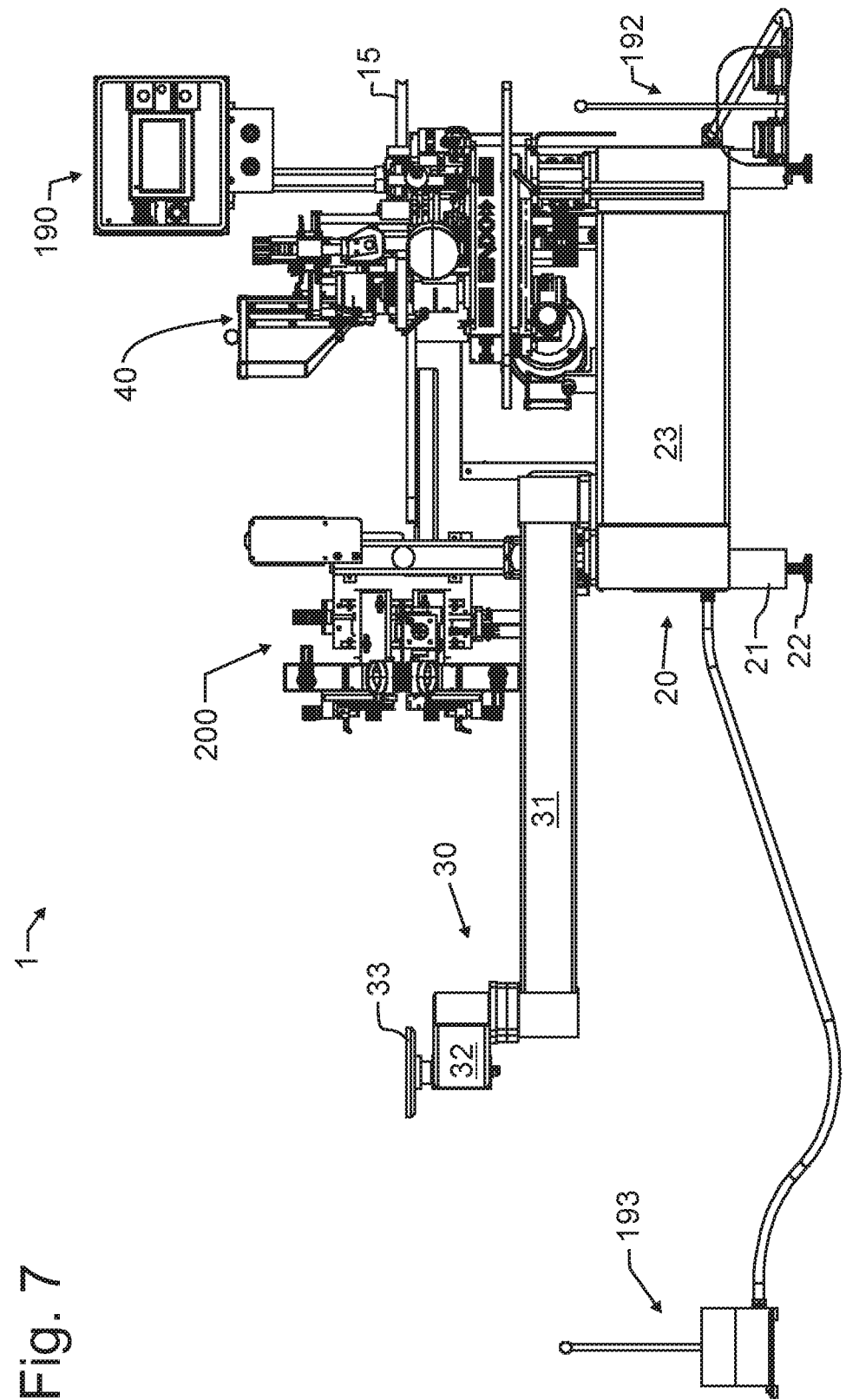
FIG. 7 illustrates the preferred embodiment edge band application machine of FIG. 1 from a front elevation view.
Figure 8:
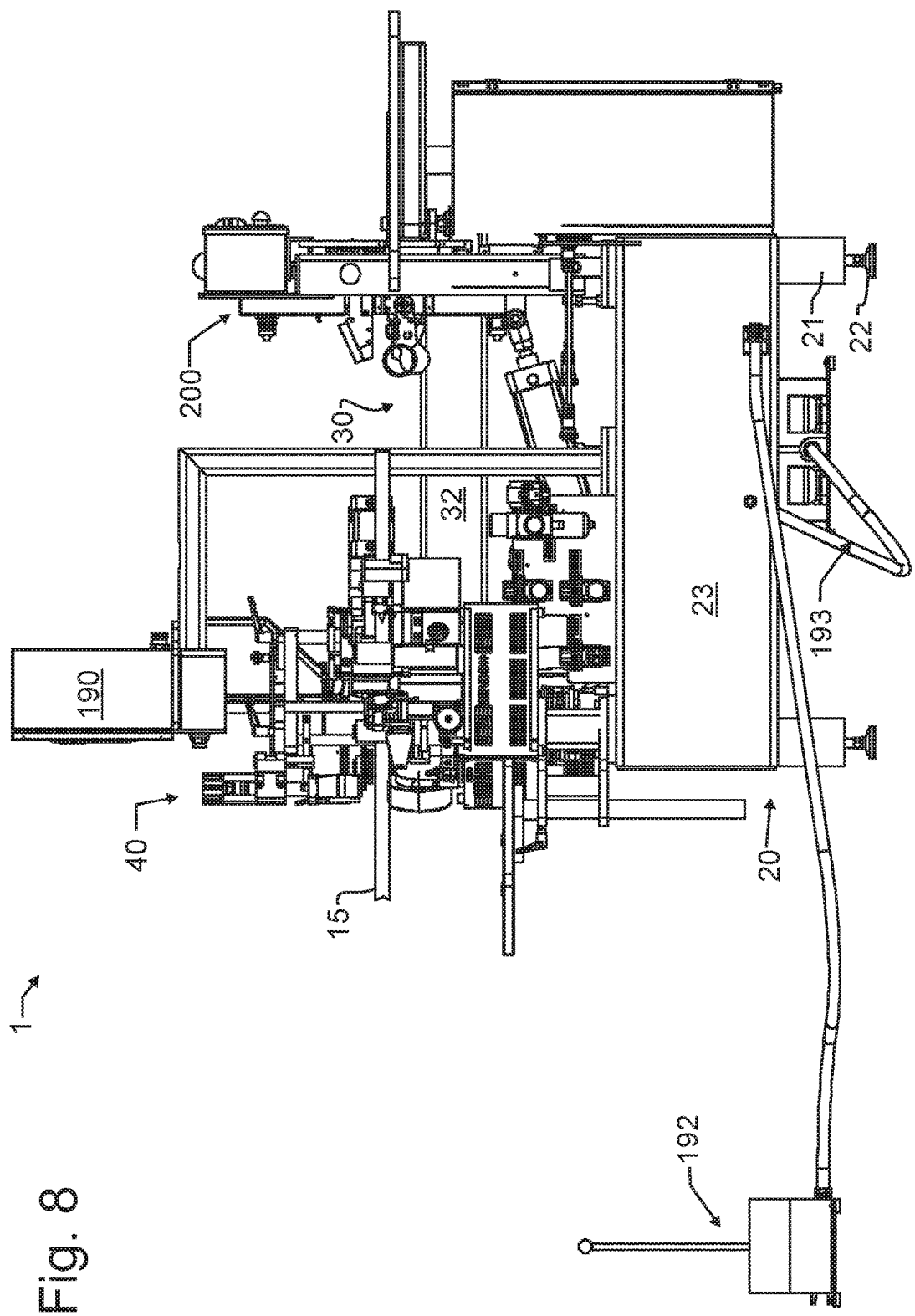
FIG. 8 illustrates the preferred embodiment edge band application machine of FIG. 1 from a right side elevation view.
Figure 9:
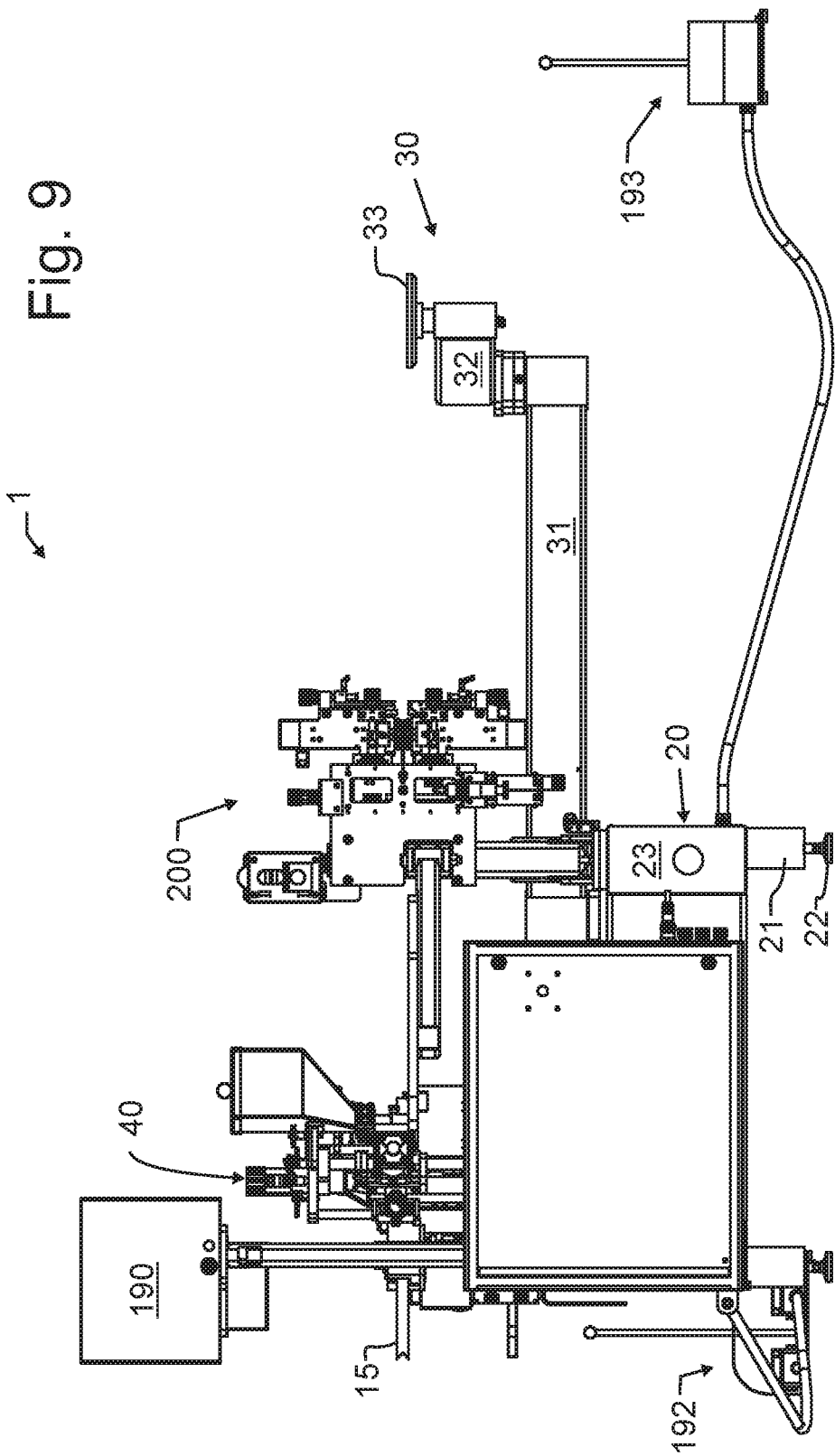
FIG. 9 illustrates the preferred embodiment edge band application machine of FIG. 1 from a rear elevation view.
Figure 10:
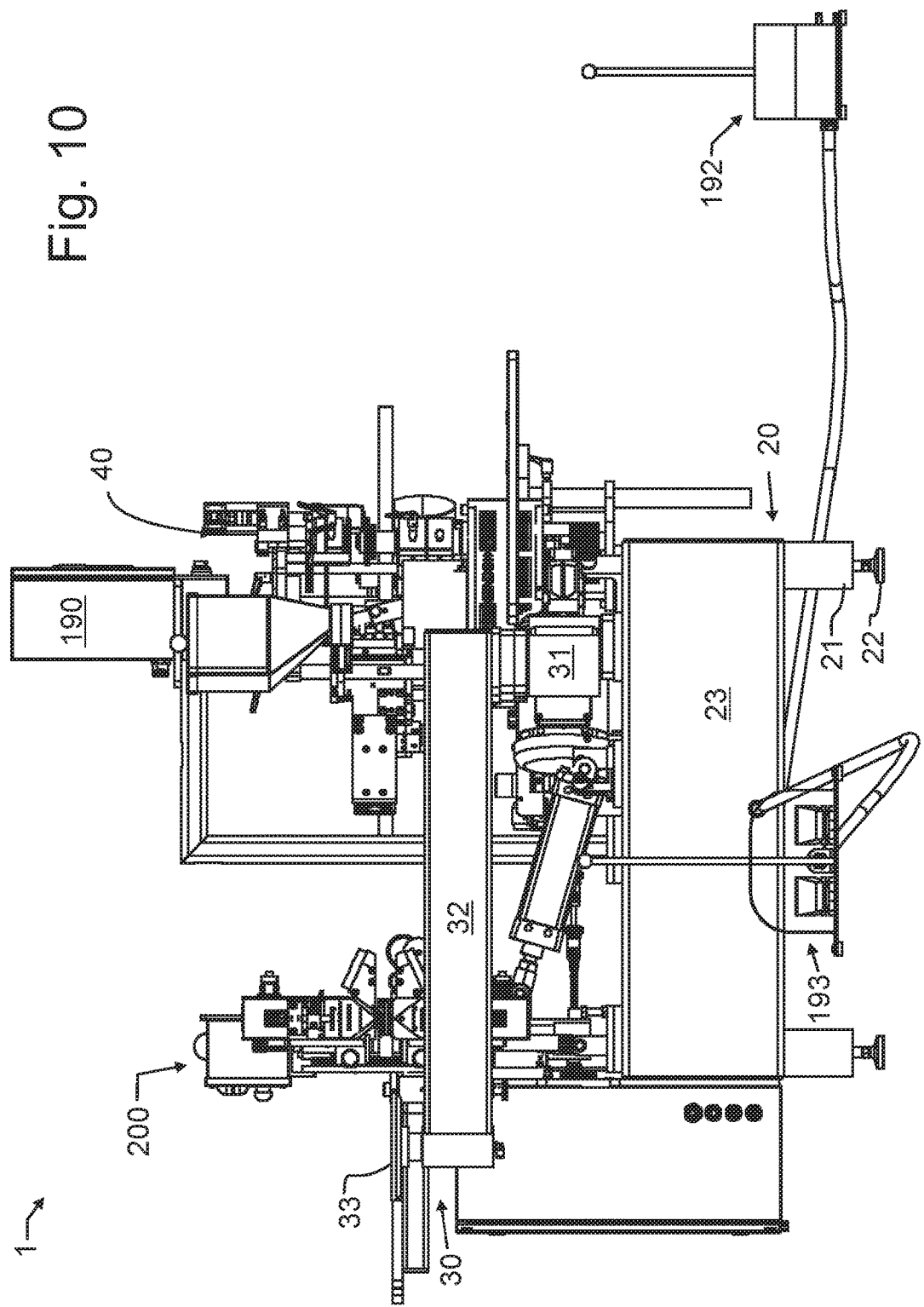
FIG. 10 illustrates the preferred embodiment edge band application machine of FIG. 1 from a left side elevation view.

In a preferred embodiment of the invention illustrated in FIG. 1, an automated edge band application machine 1 is comprised of a dispensing table 10, a base 20, work support arm 30, edging application cell 40, electronic control console 190, safety switches 192, 193, and grinder assembly 200. Edging application cell 40 is operative to apply edge band 15 to a work piece, while grinder assembly 200 is operative to grind the applied edging to a predetermined thickness and contour.

Dispensing table 10 dispenses edge band 15 from an edging band spool. Peripheral guide pins 12 and central pivot pin 13 may be provided to retain an edging band spool on the surface 14 of table 10. Surface 14 may spin in order to make dispensing easier, or in an alternative embodiment may be made of or coated with a material that allows a spool or coil of edge band 15 to slide without significant resistance. A base 11 is provided to elevate surface 14 to match or approximate an elevation that band 15 is desired to enter into edging application cell 40.

Supporting edging application cell 40 is a base 20 having a frame 23 and optional legs 21. To permit leveling, adjustable feet 22 or other suitable supports may also be provided.

A work support arm 30 has two arm members 31, 32 that may preferably be provided with pintles at each distal end, allowing work support arm 30 to move a work piece throughout an entire circle having a radius equal to the combined length of arm members 31, 32. The work piece, while not illustrated, may for exemplary purposes comprise any suitable board or sheet. Typically, and as is known in the industry, the work piece may comprise a board fabricated from wood or wood products, such as fiber board or plywood. In this case, the board will also typically be generally planar, and may have any geometry for an edge perimeter. For exemplary purposes only, and not solely limiting the present invention thereto, the board might comprise a ¾" or 1" thick medium density fiber board (MDF), and might also for exemplary purposes be in the general shape of a rectangle. However, and as will be understood from the present disclosure, one of the benefits and advantages of the present invention is the ability to apply edge banding to nearly any edge geometry, so while rectangles, circles, and ovals might be common shapes for the perimeter of the board major surfaces, many other geometries will also be served by the present invention.

Within edging application cell 40, a board drive assembly 100 illustrated and further described herein below cooperates with a work piece held upon support pedestal 33 to drive the work piece into a banding guide, also described and illustrated in greater detail later. Support pedestal 33 is preferably a vacuum support that uses suction to secure a work piece to support pedestal 33. While vacuum is preferred, any suitable technique of holding the work piece to the pedestal is contemplated and will be considered to be incorporated herein. Furthermore, in the preferred embodiment the support pedestal 33 is replaceable, and can be provided in a variety of sizes to accommodate larger and smaller work pieces. Safety switch 192 may also be provided to enable actuation of edging application cell 40 by an operator spaced a safe distance from the machinery. This allows the operator to position the work piece at a distance from edging application cell 40, rather than the operator having to simultaneously control the work piece and lean over, reach over, or otherwise access a switch dangerously close to the machinery.

In the preferred embodiment automated edge band application machine 1, edge band 15 is preferably applied that is wider than the thickness of the work piece, meaning the edge band 15 will extend either above, below or both above and below the work piece generally planar major surfaces. This ensures that edge band 15 will completely cover the edge, even if the workpiece is slightly warped, bowed or otherwise irregular.

Once edge band 15 has been adhered to the edge of the work piece and the adhesive set sufficiently, then the banded work piece may be passed through a grinder 200. Grinder 200 may be set to grind away portions of edge band 15 that extend beyond the work piece generally planar major surfaces, and may optionally also create beveled edges or other decorative ornamentation if so desired. Safety switch 193 may be provided to enable actuation of grinder assembly 200 by an operator spaced a safe distance from the machinery, rather than the operator having to lean over, reach over, or otherwise access a switch too close to the machinery.

FIGS. 2-10 illustrate the preferred embodiment edge band application machine of FIG. 1 from a wide variety of angles of illustration, to provide a more comprehensive understanding of the relationship of the various components.

Figure 11:
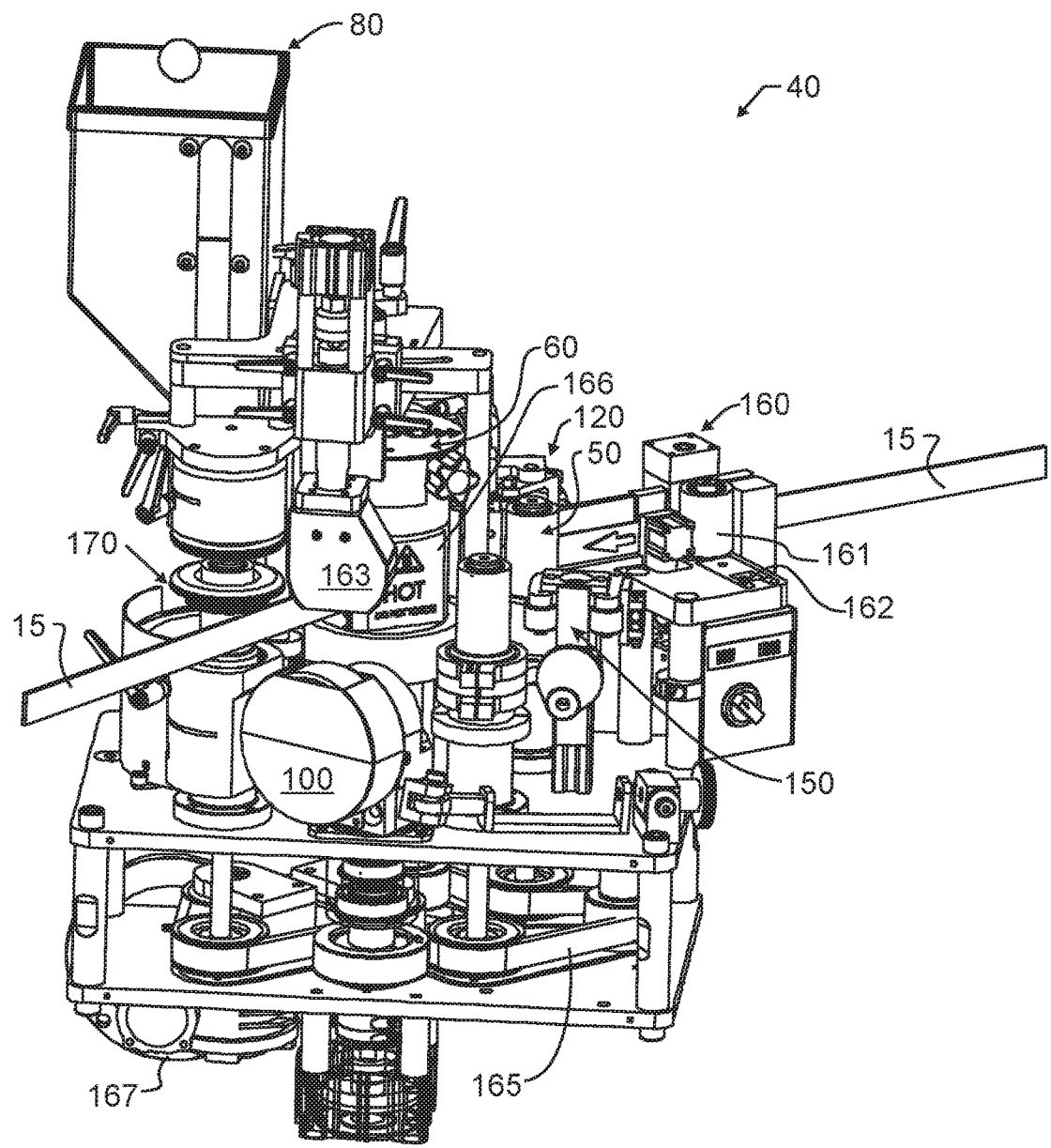
FIG. 11 illustrates a preferred embodiment edging application cell assembly used in the preferred embodiment edge band application machine of FIG. 1 from a front, slightly right side, and top perspective view.
Figure 12:
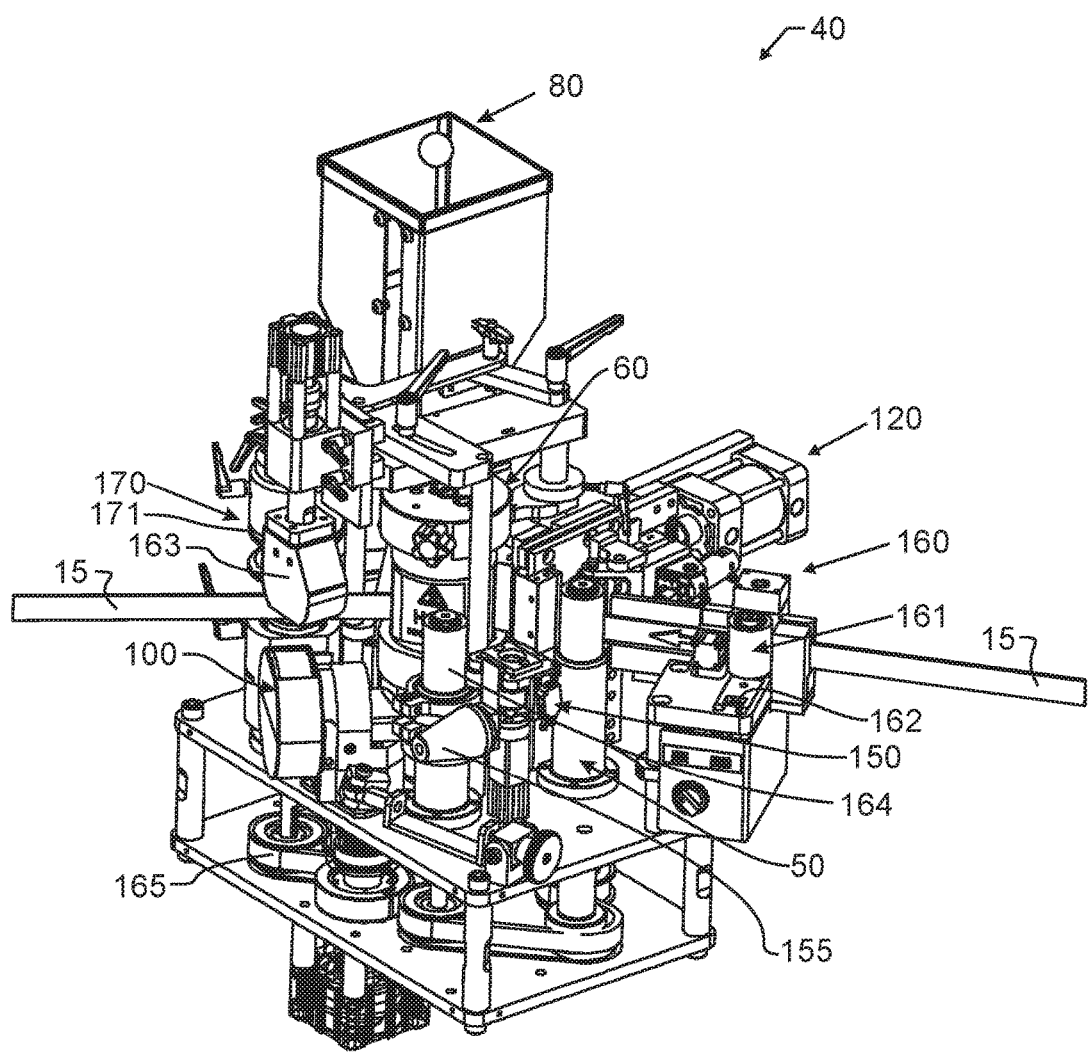
FIG. 12 illustrates the preferred embodiment edging application cell assembly of FIG. 11 from a front, right, and top perspective view.

While not essential to the workings of the present invention, in the preferred embodiment edge band application machine of FIG. 1, edge band 15 is applied using machinery that is integrated into a single unit assembly referred to herein as edging application cell 40 and illustrated in FIGS. 11 and 12. A large number of sub-assemblies are integrated therein, as will be discussed herein below. Since the edging application cell 40 is a single unit, a single drive motor may then be provided and coupled through a bell flange 167 and associated right angle transmission to drive a serpentine belt. This single drive belt helps to ensure that important components turn in synchrony.

FIGS. 11 and 12 illustrate the preferred embodiment edging application cell 40 from two different projected views. As illustrated therein, edge band 15 feeds right-to-left through an encoder assembly 160, against which the banding is held by force from spring 44. Encoder assembly 160 is used to precisely measure distances along the length of edge band 15, so that at the precise position, the banding can be cut at cutting die assembly 120. Between encoder 160 and cutting die assembly 120 is a drive spindle assembly 50 and an idler roller 140 that serves as a pinch roller, visible in FIGS. 27-30, that together move edge band 15. After leaving cutting die assembly 120, edge band 15 passes in contact with a glue pot assembly 60, where a thermoplastic adhesive is applied on what will become the inside surface. Edge band 15 is now ready to be affixed to the work piece, and this must be done while the thermoplastic adhesive is still hot. Edge band 15 moves into contact with a roller banding guide 170 between the two roller banding guide bases 171, 172, where it is squeezed on one side by the roller banding guide 170, and on the other by the work piece.

The preferred embodiment encoder assembly 160 includes at least one roller guide 161 and a plurality of edging guides to guide edge band along a longitudinal path to ensure that the edge band 15 follows an appropriate trajectory with encoder assembly 160. Spring 162 ensures that edge band 15 remains in constant contact with encoder assembly 160. The encoder assembly 160 then provides a measure of the edge band 15 used. While a rotary encoder is used in the preferred embodiment for exemplary purposes, it will be understood that any suitable technique to measure or quantify a length of banding material will be considered to be incorporated herein. Roller guide 161 defines a cylinder having a longitudinal axis. The encoder assembly 160 presents an opposed surface defining a generally planar surface. The roller guide 161 axis of rotation is offset from parallel to the generally planar surface by a minor amount, just sufficient to bias edge band 15 into contact with the plurality of edging guides. Most preferably, the top of roller guide 161 distal to serpentine belt 165 is slightly closer to encoder assembly 160 than the bottom of roller guide 160 closer to serpentine belt 165. Since the inlet guide immediately adjacent to roller guide 161 is open on the top, but otherwise enclosed, this slight tilt of roller guide 161 ensures that edge band 15 will be drawn down towards serpentine belt 165. This allows easy threading of edge band 15 and automatic positioning as soon as edge band 15 begins to move longitudinally.

The preferred cutting die assembly 120 uses a guillotine-type blade powered by a linear actuator, illustrated in greater detail in FIGS. 27-30. When desired, cutting die assembly 120 is actuated to sever edge band 15. Preferably, edge band 15 is severed at an angle other than perpendicular to the banding. This means that the seam between the starting end of edge band 15 and the terminus will overlap, thereby providing a better finished appearance than achieved with a straight cut. While a guillotine cutter is preferred, and illustrated for exemplary purposes, other known severing techniques will be considered to be incorporated herein.

The preferred glue pot assembly 60 applies glue, preferably thermoplastic glue that has been heated, to edge band 15. The glue pot assembly 60 may also preferably include a heat shield 166 to protect the product and the rest of the invention from any incidental heating.

A work piece will be captured between board drive assembly 100 and caster wheel 163 immediately above. The use of a caster wheel allows the wheel 163 to track changes in directional movement of the work piece, which might typically be a lumber product such as a board, plywood, or other construct. Board drive assembly 100 will drive the work piece towards roller banding guide 170, and roller banding guide 170 will also be rotating, in a clockwise direction when viewed from above looking down, tending to drive the workpiece and edge band 15 to the left in the illustration. The workpiece will also be in contact with another driving roller 164, which also serves to support the laser assembly 150. While the board drive assembly is preferred, other suitable work handling equipment will be considered to be incorporated herein. For exemplary purposes only, and not solely limiting the invention thereto, such apparatus may include robot-controlled tables, robotic arms, and the like.

Figure 34:
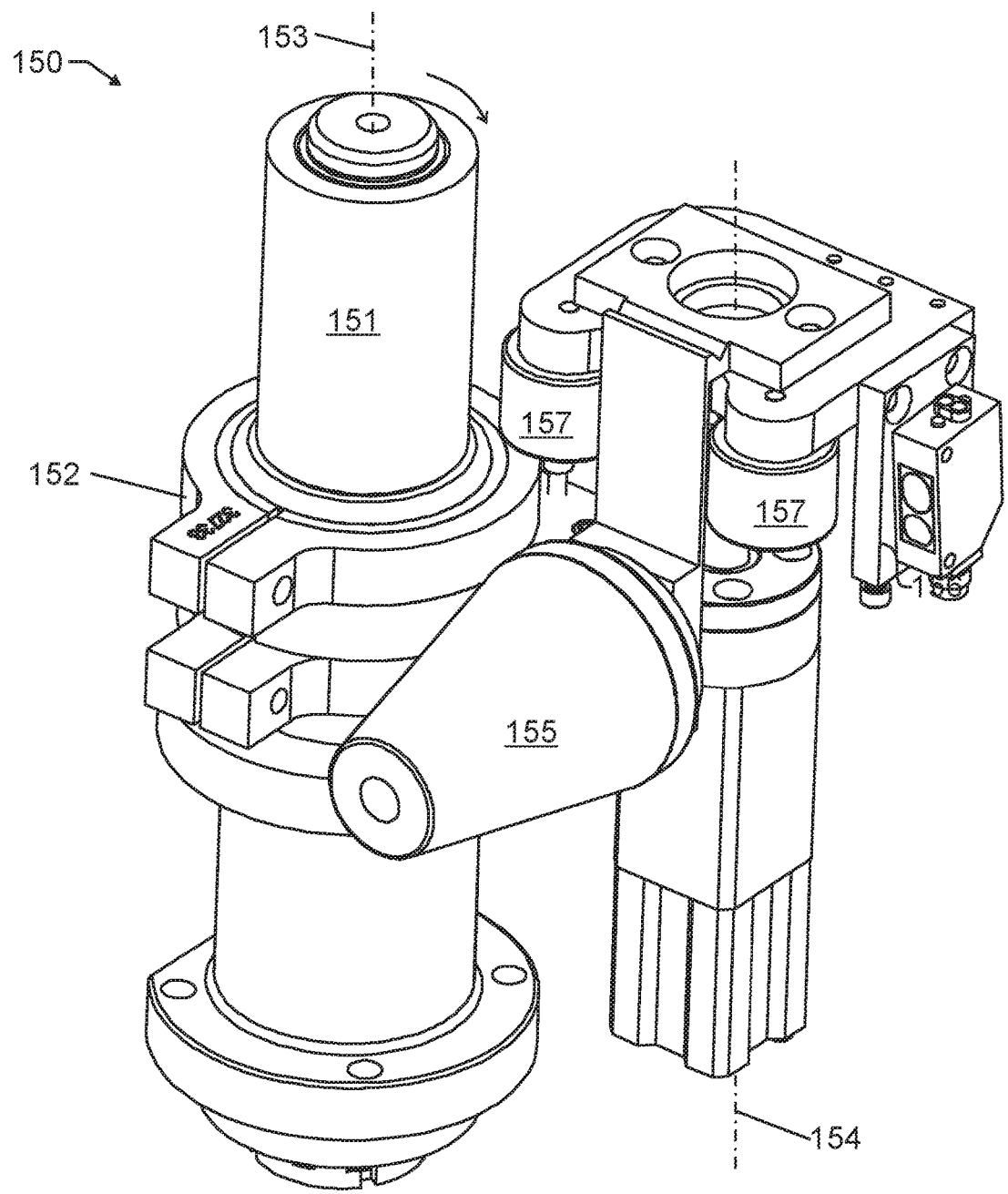
FIG. 34 illustrates the laser assembly mounted upon a board driving roller from front projected view.
Figure 35:
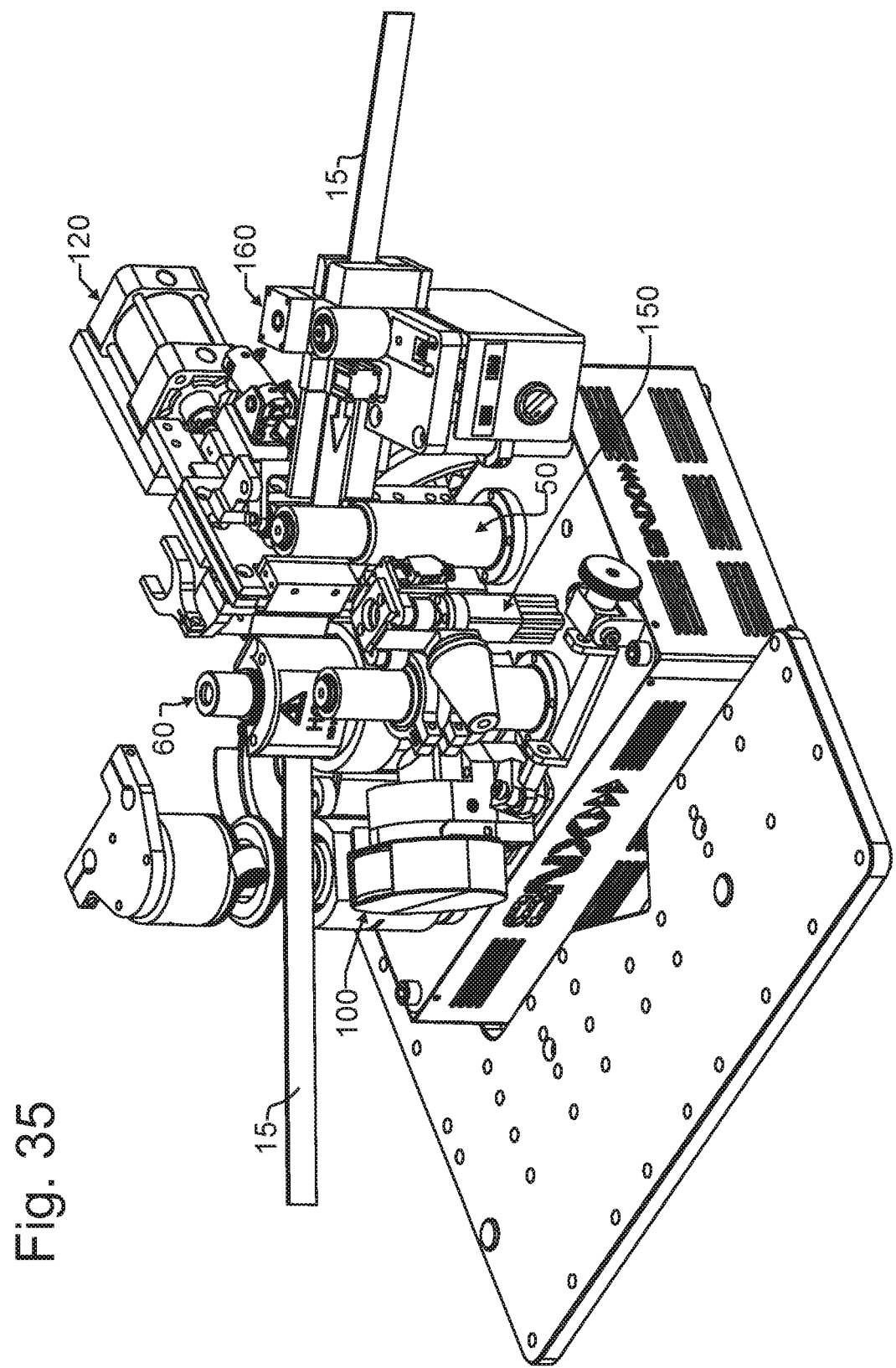
FIGS. 35-37 illustrate the preferred embodiment edging application cell of FIGS. 11 and 12 from projected view, and successively sectioned by a horizontal plane at progressively lower elevation above the base, and while also in FIG. 37 retaining the edge band 15 and several banding guides.

Laser assembly 150, which is illustrated in enlarged view in FIG. 34, is preferably spring loaded to pivot about the vertical shaft of driving roller 164, and also pivots about a second vertical axis offset therefrom. This combination of two pivots, a pair of follower rollers, and a spring allows laser assembly 150 to track with the edge of the work piece. Laser assembly 150 also has a cone 155 extending therefrom along a horizontal axis, which ensures that the laser assembly will track the height of the workpiece lower edge. As noted herein above, each of the drive components is coupled to the serpentine belt 165.

Figure 13:
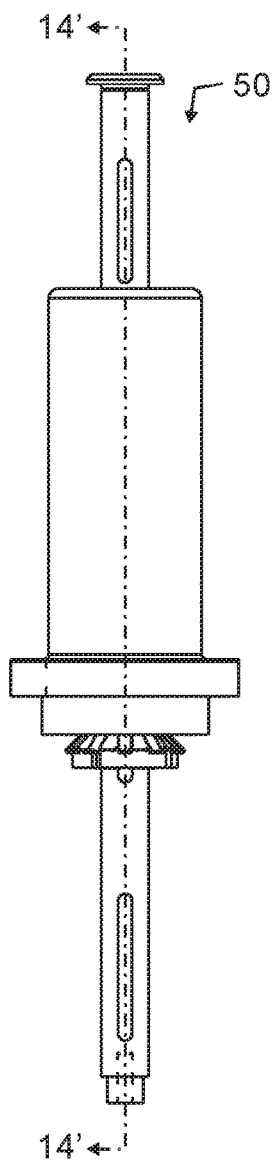
FIGS. 13 and 14 illustrate a preferred embodiment drive spindle assembly used in the preferred embodiment edge band application machine of FIG. 1 from a front elevation view and vertical plane section view, respectively.
Figure 14:
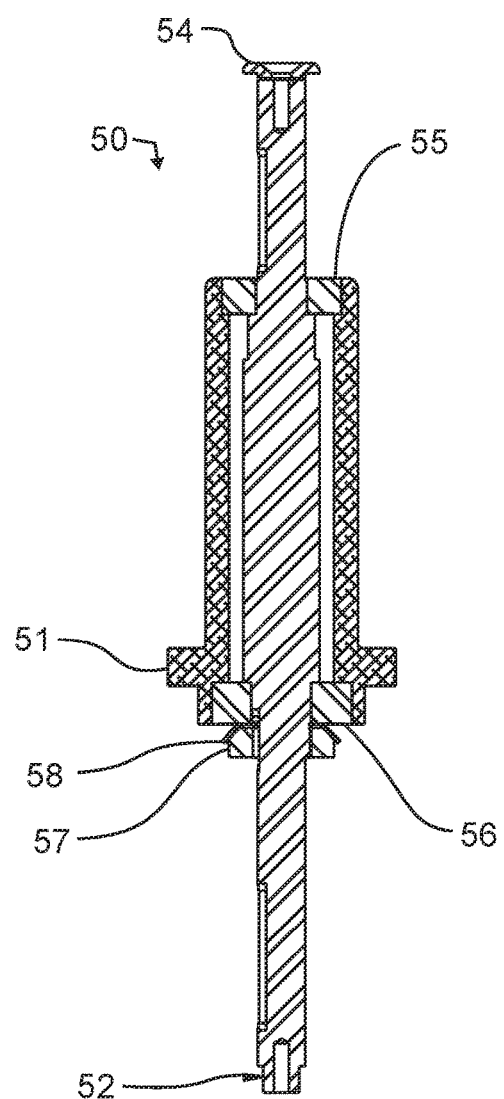
Figure 15:
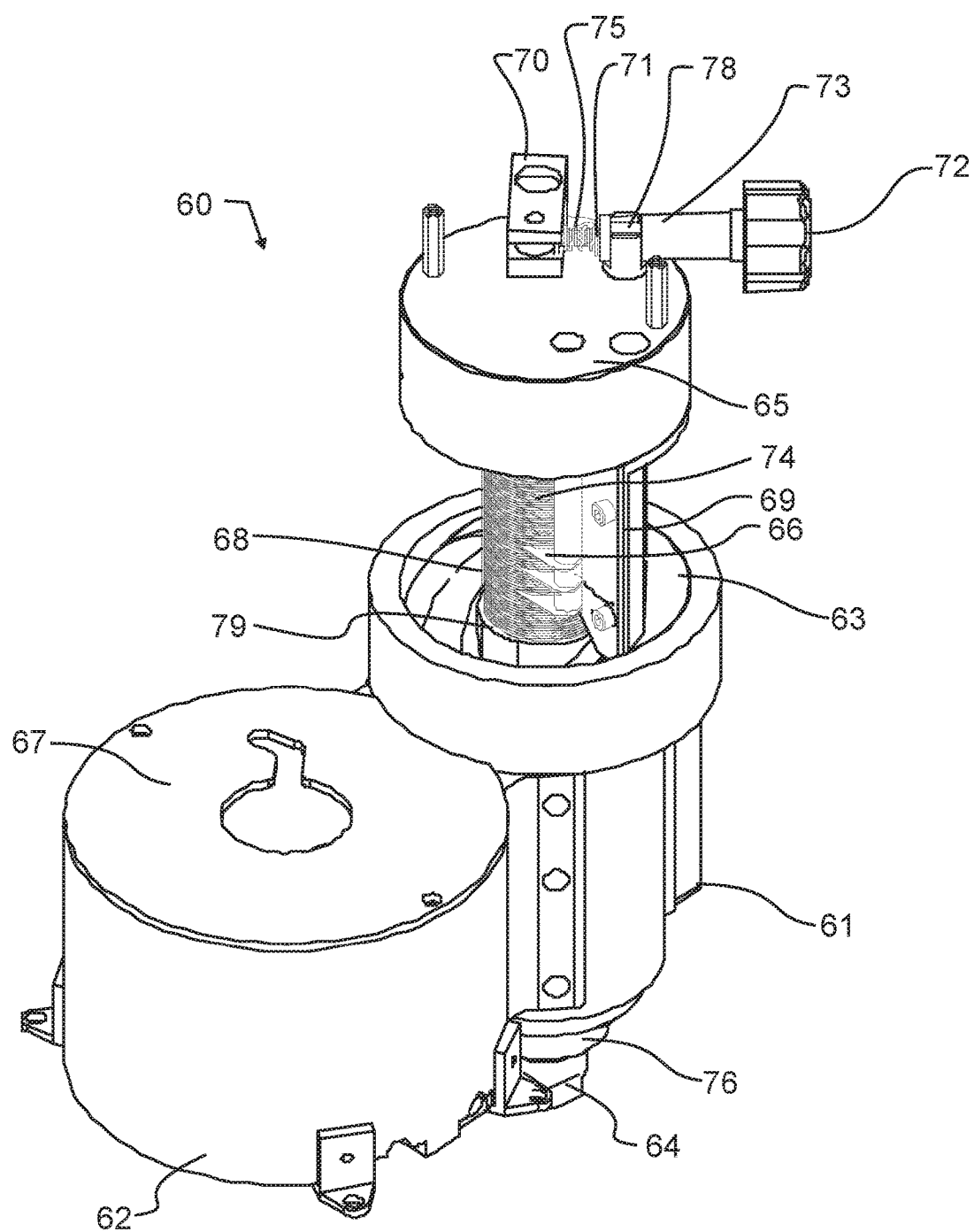

FIGS. 13 and 14 illustrate a preferred embodiment drive spindle 50. A roller housing 51 surrounds the roller spindle shaft 52. A pair of suitable bearings or bushings 55, 56 hold the two in spaced co-axial alignment. A roller retainer cap 54 secures a roller 53 (visible in FIG. 31, for example) in place on a first end, and a locknut 57 and washer 58 secure the other end of the spindle. Under lock nut 57, and about spindle shaft 52, a pulley (not illustrated here) will be attached for coupling with serpentine belt 165.

FIGS. 15-20 illustrated a preferred embodiment glue pot 60. While any suitable adhesive may be used, in the preferred embodiment automated edge band applicator 100, thermoplastic glue is used. As is well known, thermoplastic adhesives may be heated to a semi-fluid state, applied to surfaces to be adhered, and then cooled to rapidly achieve nearly full working strength. At room temperature, the adhesive will typically have the characteristic of common plastics, solid to the touch and not sticky or tacky. They may be provided in any suitable form, ranging from sticks and rods to pellets and grindings. Once heated these thermoplastic adhesives become more fluid, and are often quite sticky. This allows the adhesive to flow to some degree, and be captured within surface pores and the like.

The thermoplastic adhesive is preferably provided in small beads, pellets, grindings or the like, and is first received within the tank side 62 of glue pot 60. A removable glue pot tank cover 67 is provided to prevent the adhesive from overflowing, while still permitting cleaning and other servicing. The glue pot tank side 62 is in communication with auger side 61 of the glue pot, allowing the adhesive to move from the tank to glue pot auger 64. A glue pot auger spacer 63 is provided to ensure alignment and permit the adhesive to surround auger 64, and a bearing and holder 76 is provided to facilitate rotating of auger 64. An auger cap 65 is provided adjacent the top of glue pot 60, which helps to contain and isolate the adhesive.

As edge band 15 passes adjacent glue pot 60, a scraper 68 will remove any debris that might interfere with proper bonding or that might contaminate glue pot 60. Next, edge band 15 will pass through and adjacent to or in contact with glue pot blade shaft 74, typically near glue pot blade bottom 79. Glue will then coat edge band 15. As edge band 15 leaves glue pot blade shaft 74, any excess material that is undesirably adhered will be removed by glue pot scraper 69 in the manner of a doctor blade. Adjustment of the applied glue, through controlled spacing between glue pot blade shaft 74 and edge band 15, is controlled using glue adjuster block 70 in cooperation with adjusting knob 72, adjuster spacer 73, threaded shaft 71 surrounded by compression spring 75, and glue pot adjuster capture 78. Glue pot adjuster capture 78 is fixed to auger cap 65 and allows rotation of adjusting spacer 73 without axial translation. Since threaded shaft 71 is immovable secured to adjusting spacer 73, rotation will cause threaded shaft 71 to either thread into or thread out of one end of glue adjuster block 70. The other end of glue adjuster block 70 may be rotated, and so will rotate as threaded shaft 71 is turned. This in turn shifts glue pot blade shaft 74 closer to or farther from edge band 15. A compression spring 75 may also be provided generally co-axial with and encompassing threaded shaft 71. This creates sufficient friction to prevent unintentional and uncontrolled rotation of knob 72, threaded shaft 71, and adjuster spacer 73, while still permitting ready manual adjustment.

When very thin edge band 15 is used, such as the 0.5 mm banding described herein above, the band 15 will tend to stick with the adhesive in glue pot 60, and so may try to wrap around glue pot blade shaft 74. To prevent this undesired wrapping, one or a plurality of edging separator fingers 66 may be provided. These act in the manner of a cattle guard on a locomotive, simply and gradually lifting any errant edge band 15 away from glue pot blade shaft 74. By providing several spaced fingers 66, most of the adhesive desired to be transferred onto edge band 15 will remain. FIG. 43 provides an enlarged illustration in the vicinity of the edging passing in contact with the glue pot and roller banding guide. As is apparent in that illustration, if edge band 15 begins to wrap about glue pot blade shaft 74, fingers 66 will release edge band therefrom.

Figure 21:
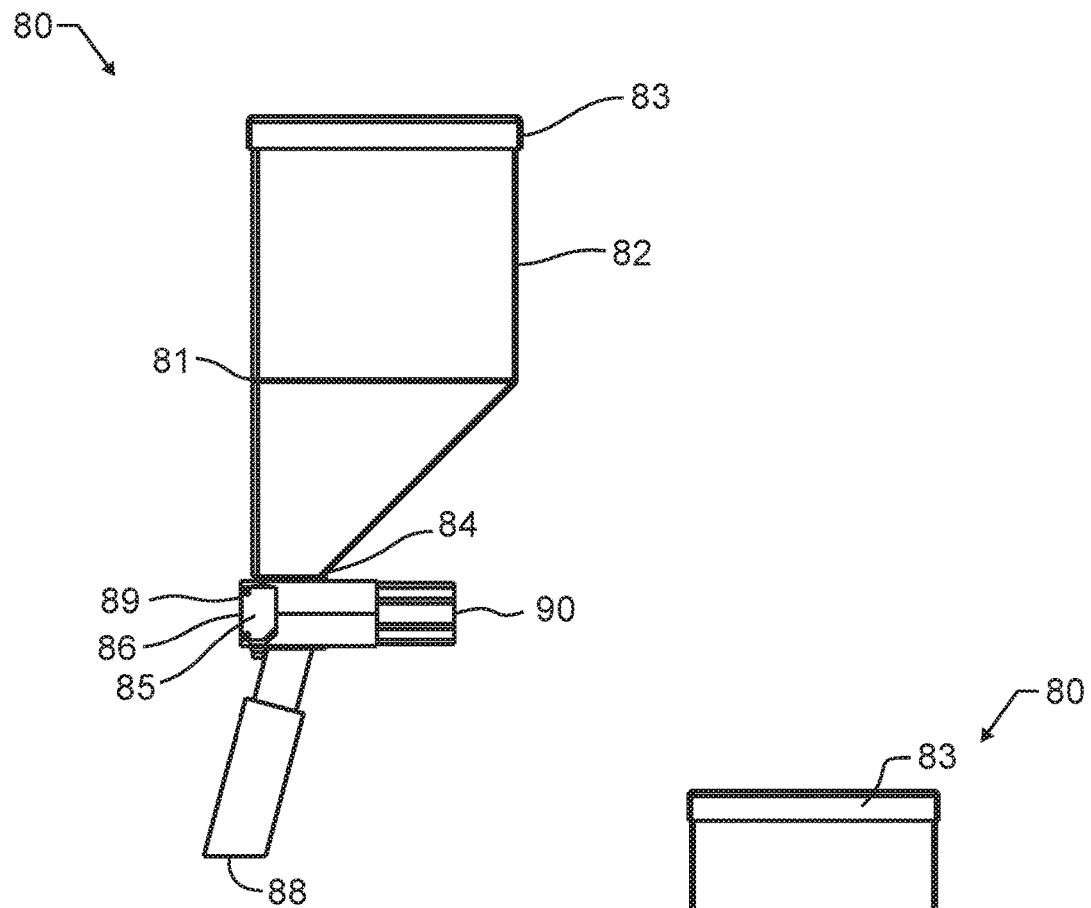
FIGS. 21 and 22 illustrate a preferred embodiment glue dispenser assembly used in the preferred embodiment edge band application machine of FIG. 1 from side and front elevation views, respectively.
Figure 22:
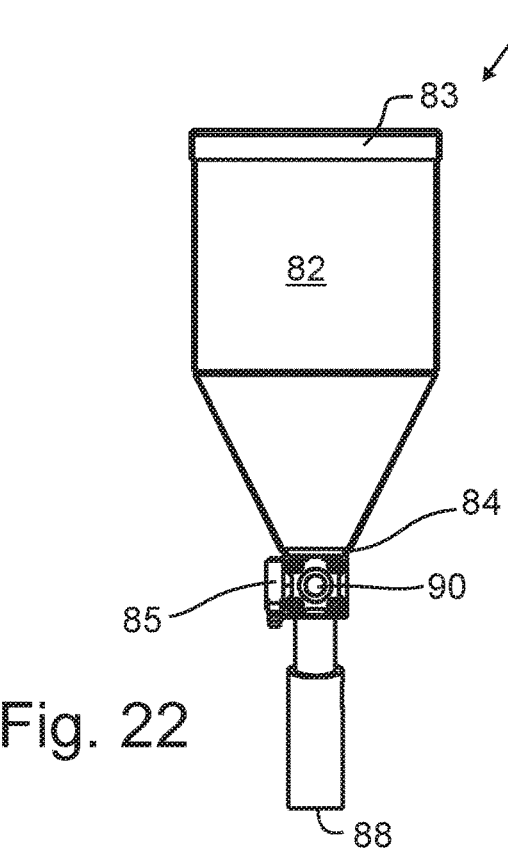

FIGS. 21-22 illustrate the preferred embodiment glue dispenser 80, which feeds cold and solid adhesive to the glue pot tank side 62. A glue dispenser tank 81 holds a reserve supply of glue. The glue dispenser tank back 82 and bottom 84 may meet at an angle other than perpendicular in order to provide a funnel-type shape, so that all glue can be dispensed efficiently. A glue dispenser tank cover 83 provides a means to refill the glue dispenser tank 81.

The glue dispenser tank 81 is preferably positioned above a valve 90 having a valve block 89. The bottom 86 of the valve block 89 connects with a drain 88. Drain 88 preferably conducts the glue into the glue pot tank side 62. In the preferred embodiment, valve 90 is electrically controlled to adjust the flow rate to glue pot 60. A distance determining laser 85, which may be embodied in any suitable detection apparatus, is directed in to glue pot 60, to measure the height of molten glue contained therein. In the event the level drops to a desired minimum, then valve 90 will be opened to allow a quantity of glue to pass through and down into glue pot tank side 62.

While a thermoplastic adhesive is illustrated in the preferred embodiment automated edge band application machine, as noted other methods of adhesion are contemplated herein as well. For exemplary purposes only, and not solely limiting the invention thereto, the edge banding material could comprise a thermoplastic composition. In such case, the interior face of the banding would then be heated, either by direct contact, through a heated air stream, infra-red energy transfer, dielectric heating, or any other suitable technique, to sufficiently heat and melt the interior surface to permit self-adhesion with the work piece.

Figure 24:
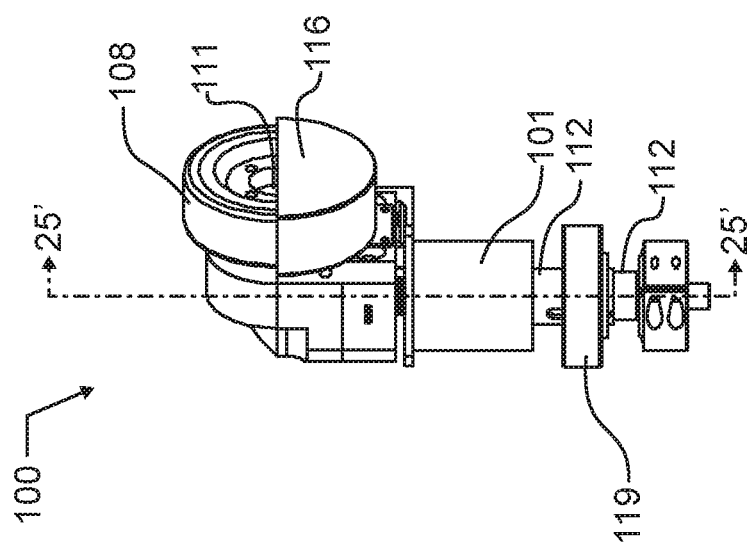
FIGS. 23-25 illustrate a preferred embodiment board drive assembly used in the preferred embodiment edge band application machine of FIG. 1 from rear and front elevation views and a vertical plane section view taken along section line 25', respectively.
Figure 23:
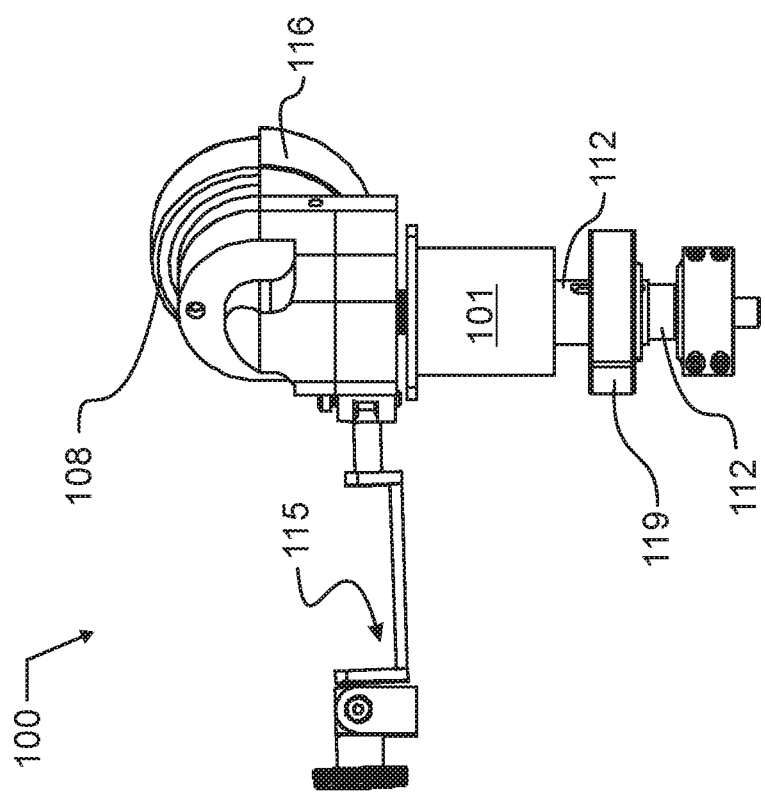
Figure 25:
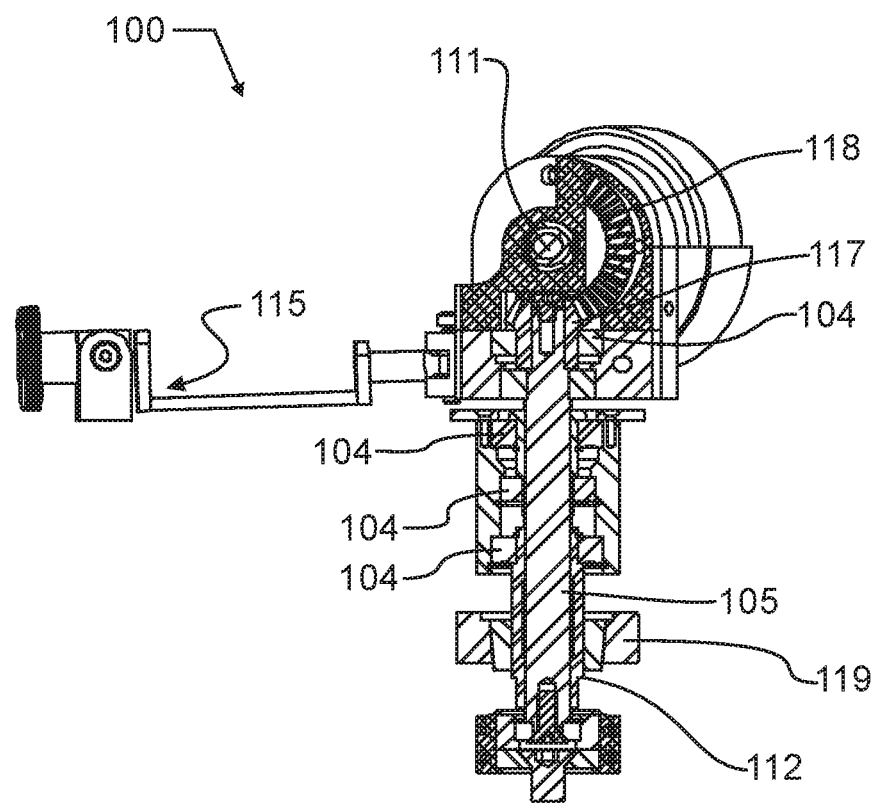
Figure 26:
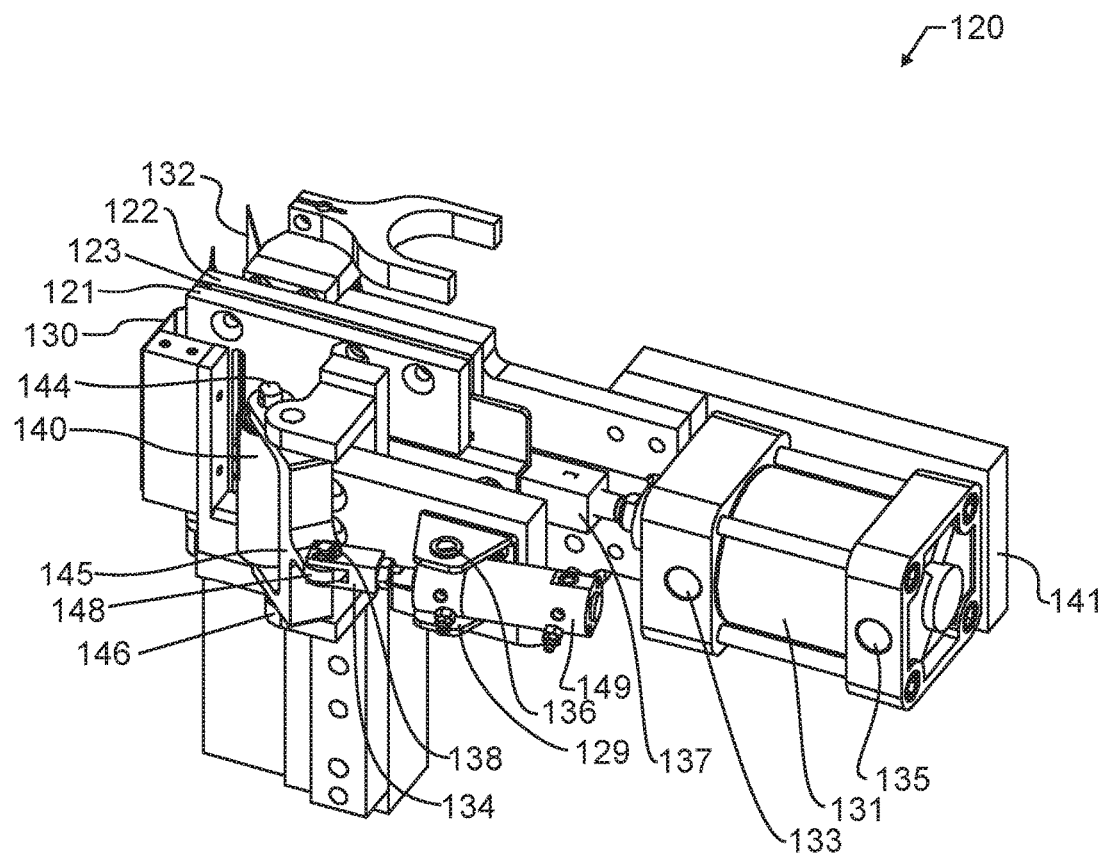
FIGS. 26-30 depict the preferred embodiment guillotine cutting die assembly from rear projected, front projected, top, front and side views, respectively.
Figure 27:
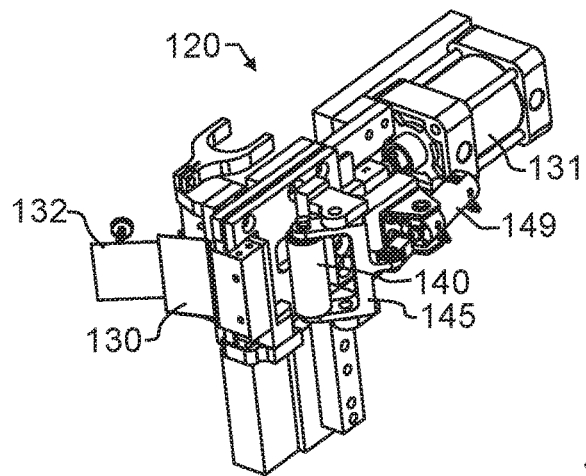
Figure 28:
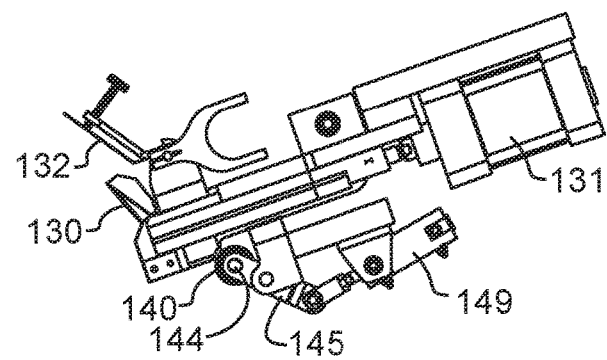
Figure 29:
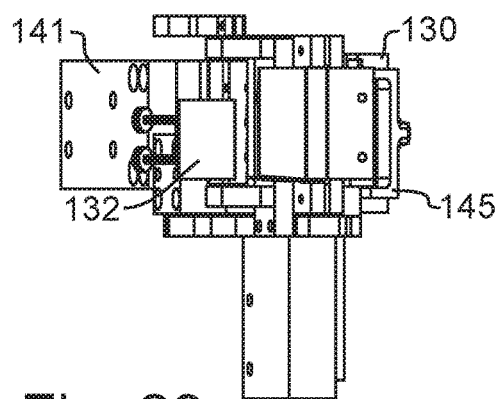
Figure 30:
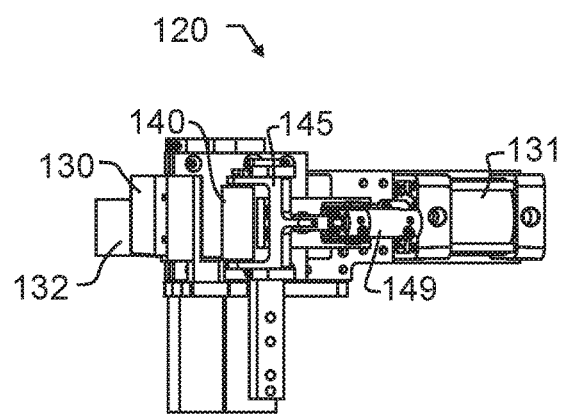

FIGS. 23-25 depict a preferred embodiment board drive assembly 100. A feed roller 108 comes into contact with the work piece, in order to support the work piece and propel it towards edge band 15. Preferably, a feed roller spindle 111 couples to and rotates feed roller 108. A driven gear bottom guard 116 encases and protects the assembly. While not illustrated in these FIGS. 23-25, a similar upper guard may also be used to further enclose feed roller 108, as visible for example in FIGS. 11 and 12. A drive spindle in the form of splined shaft 105 visible in FIG. 25 projects upwards through the board drive assembly 100 and is supported by bearings 104, and is protected within the drive spindle housing 101. A pulley 119 engages externally with serpentine belt 165, and internally with splined sleeve 112. Splined sleeve 112 engages coaxially and circumferentially about splined shaft 105, and the splines engage to lock the two together in rotary movement. However, splined shaft 105 can slide longitudinally relative to splined sleeve 112, which permits feed roller 108 to be raised into firm engagement with work pieces having different thicknesses. To convert the vertical axis rotary motion of splined shaft 105 into the horizontal axis rotary motion required for feed roller spindle 111 and feed roller 108, a straight bevel pinion 117 terminates splined shaft 105. Pinion 117 engages with straight bevel gear 118, which is in turn rigidly coupled to feed roller spindle 111. To control and adjust the available range of angular orientation, a drive adjuster 115 is anchored distal to feed roller 108, and couples to the rotary region adjacent to feed roller 108. The length of drive adjuster 115 may be altered by rotation of a knob provided therewith.

FIGS. 26-30 depict the preferred embodiment guillotine cutting die assembly 120. Idler roller 140 generates a pinching force to squeeze edge band 15 into good contact with a separate drive spindle assembly 50, visible for exemplary purposes in FIGS. 31 and 32. The cutter is contained and guided by extrusion cutting exit die 121 and extrusion cutting exit die 122, the pair which are held in spaced relationship by spacer 123. The linear cutting motion is provided by cylinder 131, which is coupled to blade thruster 137. A pair of bearing blocks 133, 135 supported by cylinder mount 141 may be provided to support cylinder 131 securely. Idler roller 140 is driven by roller cylinder 149 which is pivotally supported within bracket 129 by pintles 136. Roller cylinder 149 linearly drives clevis 134, which is coupled through clevis pin 138 to swingarm pivot ear 148 extending from idler roller swingarm 145. A pair of spaced pivot pads 146 provide suitable pintles for idler roller swingarm 145, and a pin 144 defines central shaft about which idler roller 140 may spin. A pair of edging guides 130, 132 hold edge band 15 in place securely during a cutting operation. The force applied may be adjusted using the screws provided with edging guide pressure plate 132.

Figure 31:
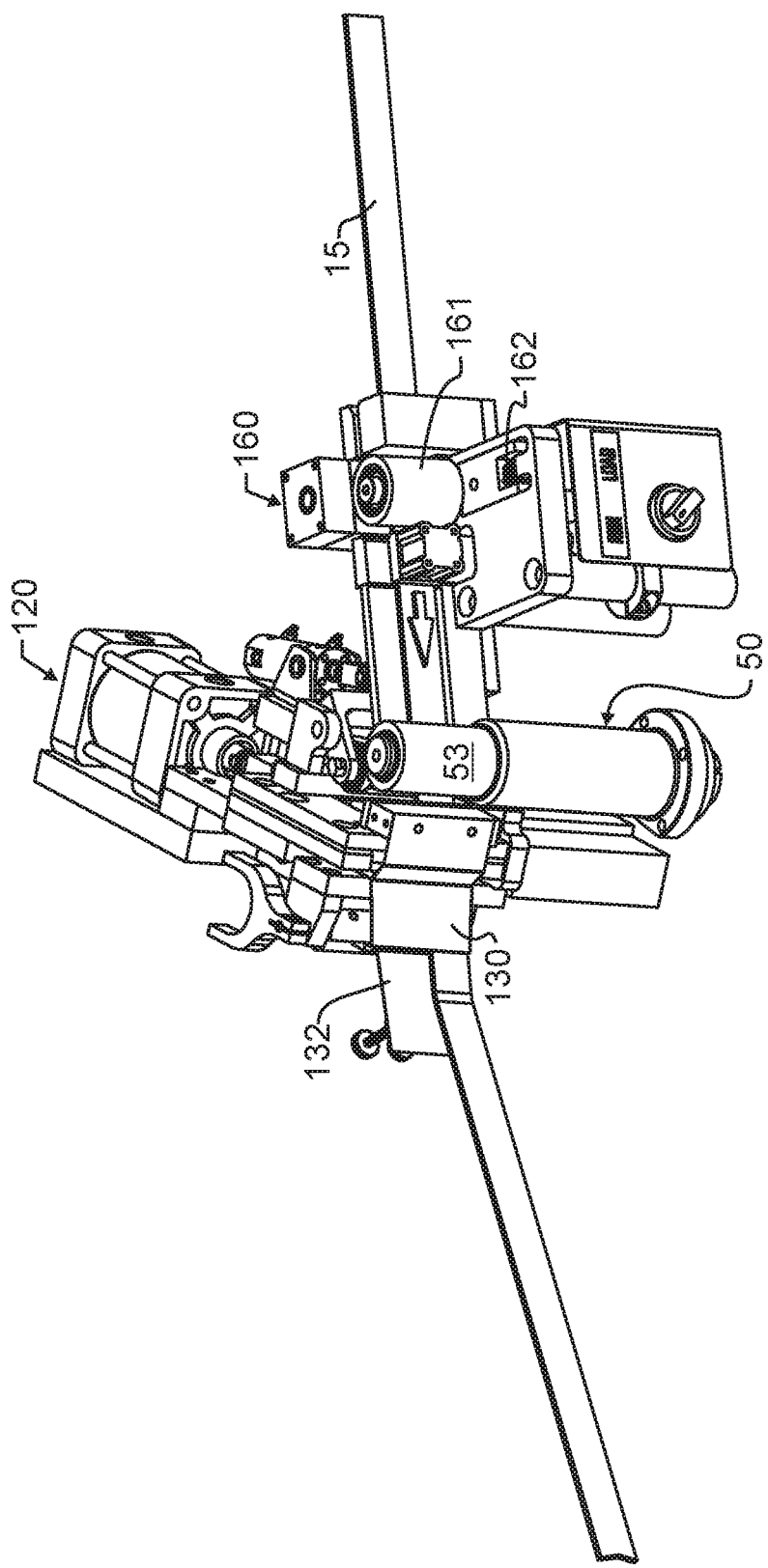
FIGS. 31-33 provide various viewing angles of the band, encoder, and guillotine cutting die assemblies from generally front projected, top plan, and rear projected views, respectively.
Figure 32:
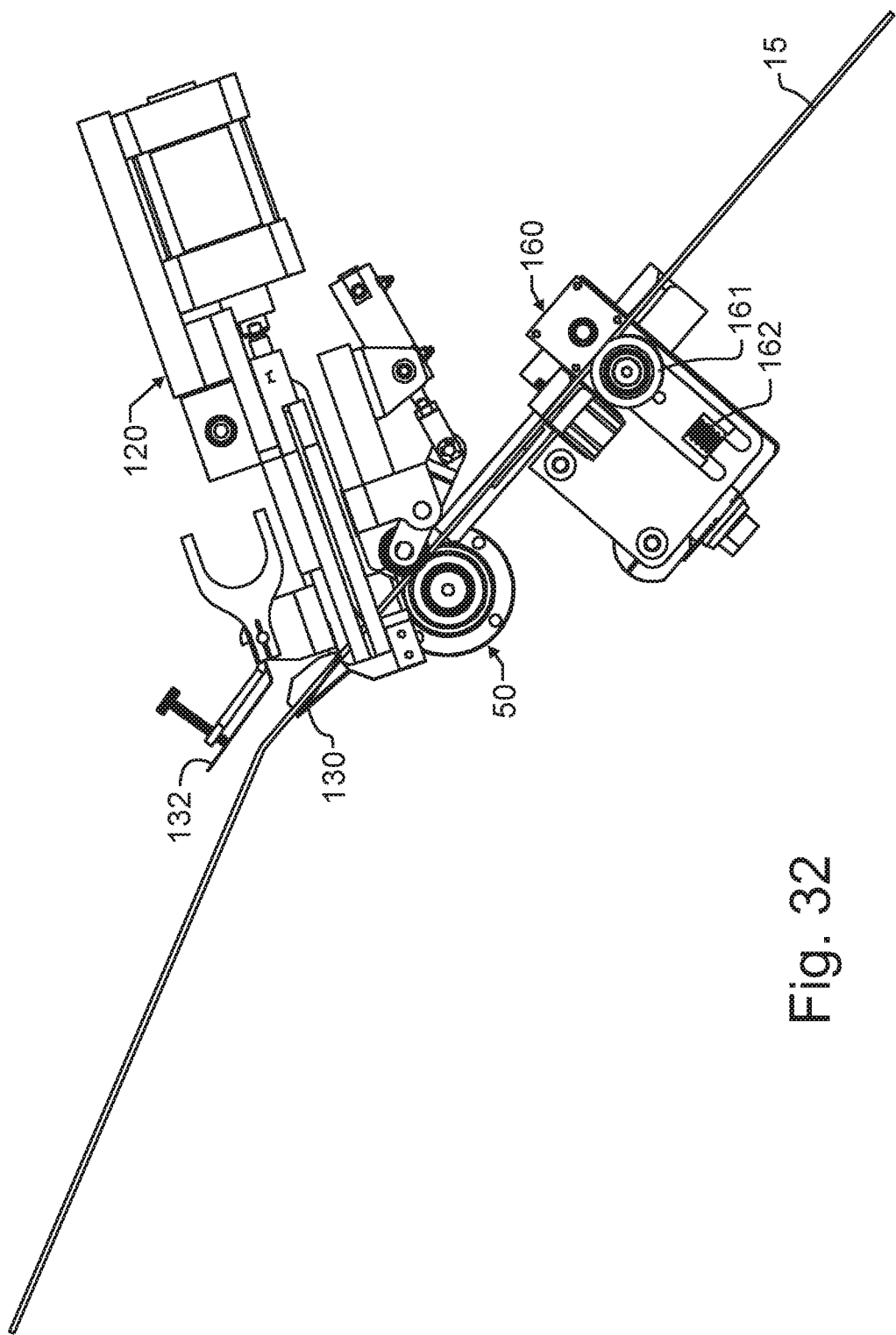
Figure 33:
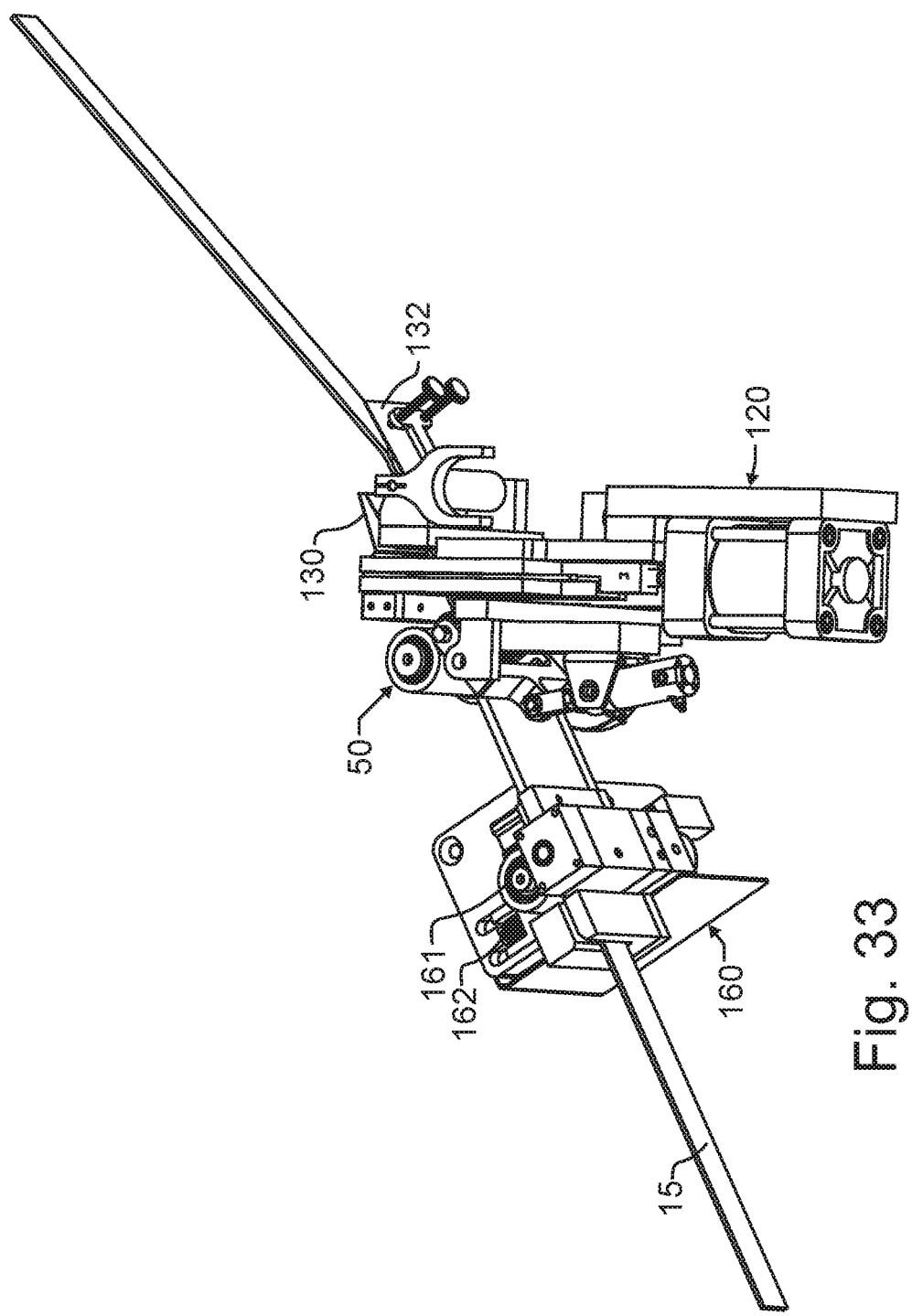

FIGS. 31-33 provide various viewing angles of the band, encoder, and guillotine cutting die assemblies, and better illustrate the arrangement of edging guides 130, 132.

FIG. 34 illustrates the laser assembly 150 which is mounted upon a board driving roller 151. The laser support 152 pivots about the vertical shaft 153 of board driving roller 151, defining a first axis of rotation. Laser support 152 is also preferably spring loaded to drive laser support 152 in the same rotary direction as board driving roller 151 rotates. When the workpiece is in contact with board driving roller 151, the laser assembly cone 155 is then also pressed into contact with the workpiece. The laser assembly 150 also pivots about a second axis of rotation 154 that is generally parallel to but offset from first axis of rotation 153. This combination of spring force driving the laser and photodetector 156 to the work piece edge and a second axis of free rotation causes both of the idler rollers 157 to press against the edge of the work piece. In addition, laser assembly 150 also has a cone 155 extending along a horizontal axis. The same spring force provided by laser support 152 driving idler rollers 157 into contact with the work piece edge also drive cone 155 under but engaged with the work piece, which ensures that laser and photodetector 156 will track the height of the workpiece lower edge. The use of a conical geometry for drive cone 155 helps to ensure that the cone will properly slide under the work piece at the time of initial engagement, allowing idler rollers 157 to firmly engage with the edge of the work piece. This combination of two axes of rotation, a pair of idler rollers 157, and a spring within laser support 152 allows laser assembly 150 to immediately engage with and track the edge of the work piece.

The laser and photodetector 156 are aligned to just below the bottom edge of the surface of the work piece, or, in other words, just below the highest point of the largest diameter of cone 155. If there is no edge banding on the work piece, the laser will simply shine forward, and not be reflected back to the photodetector. However, when the edge banding is nearly fully wrapped about the work piece circumference, the leading end of the band (the first part of the band adhered to the work piece) will pass in front of the laser. As noted herein above, the edge band is preferably wider than the work piece, meaning it will extend below the edge of the work piece. With proper alignment, this will mean the edge band will reflect the laser back to the photodetector. The moment this happens, a processor such as a micro-processor, micro-controller unit, CPU, or any other suitable electronic control device, which might for exemplary purposes be provided as a part of console 190, will be notified. This information will then be used to determine how much more edge band 15 to pass encoder assembly 160 and cutting die assembly 120 before the guillotine cutter is actuated and the band severed.

Figure 36:
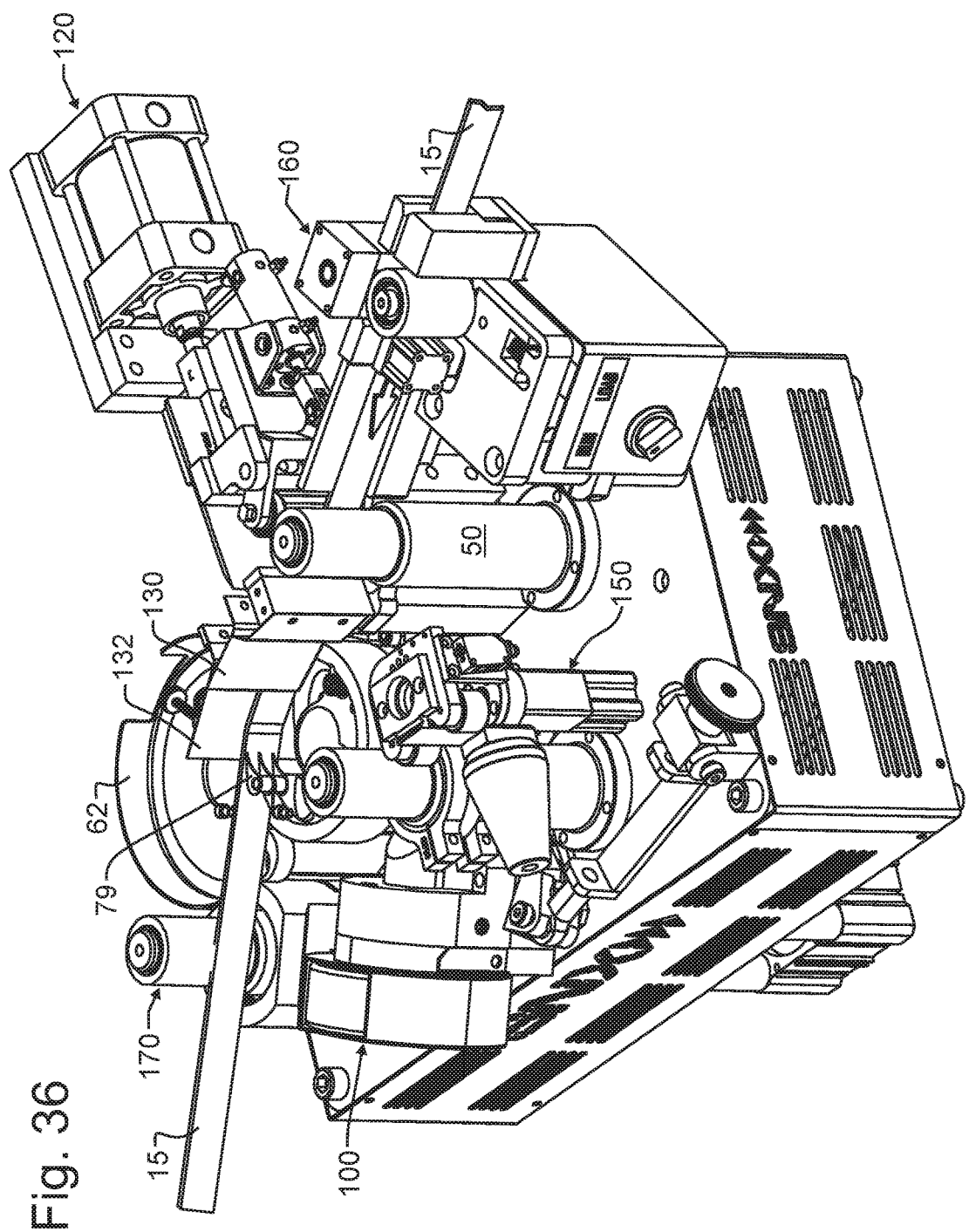
Figure 37:
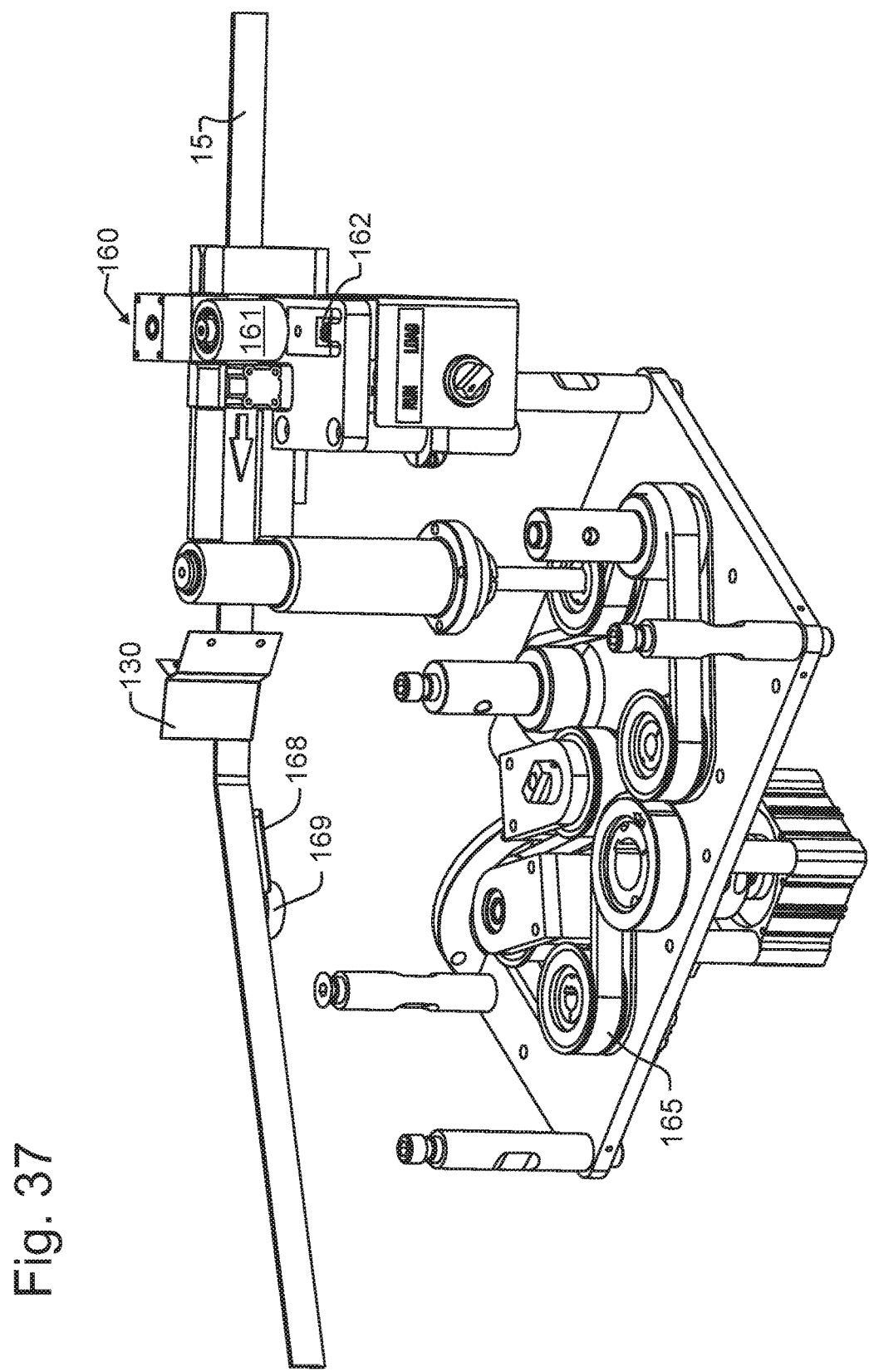
Figure 38:
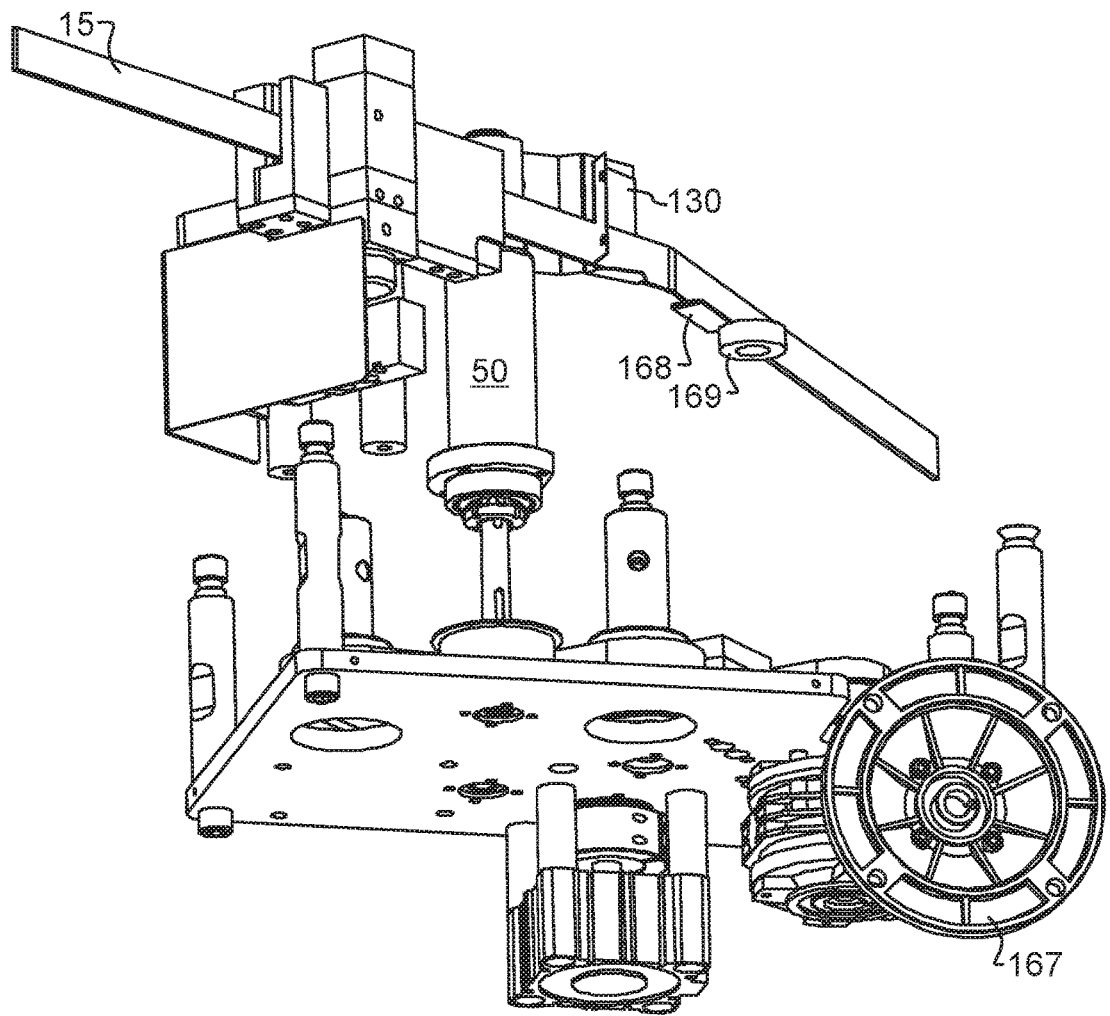
FIG. 38 illustrates the preferred embodiment edging application cell of FIG. 37 but from a rear and bottom projected view.
Figure 39:
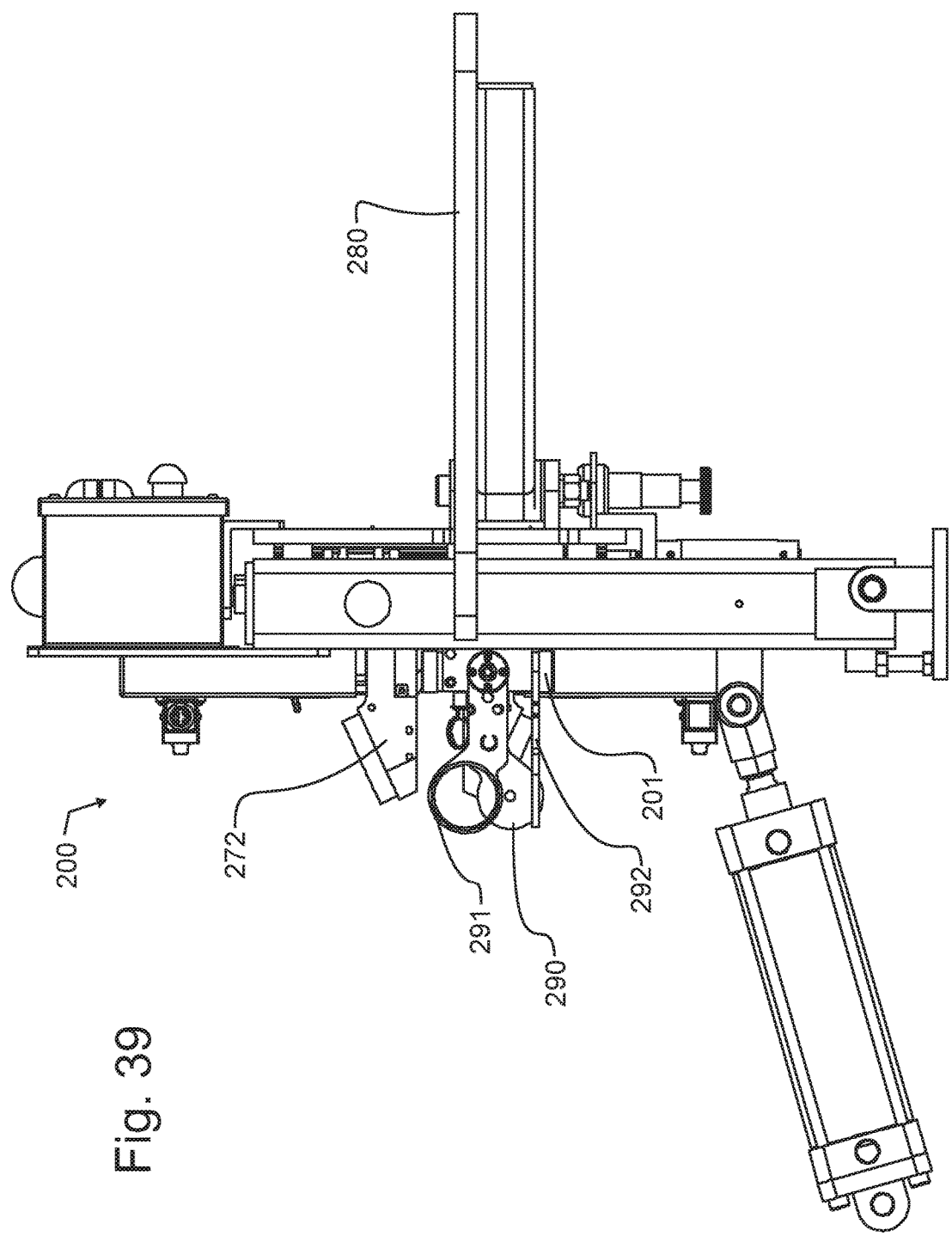
Figure 40:
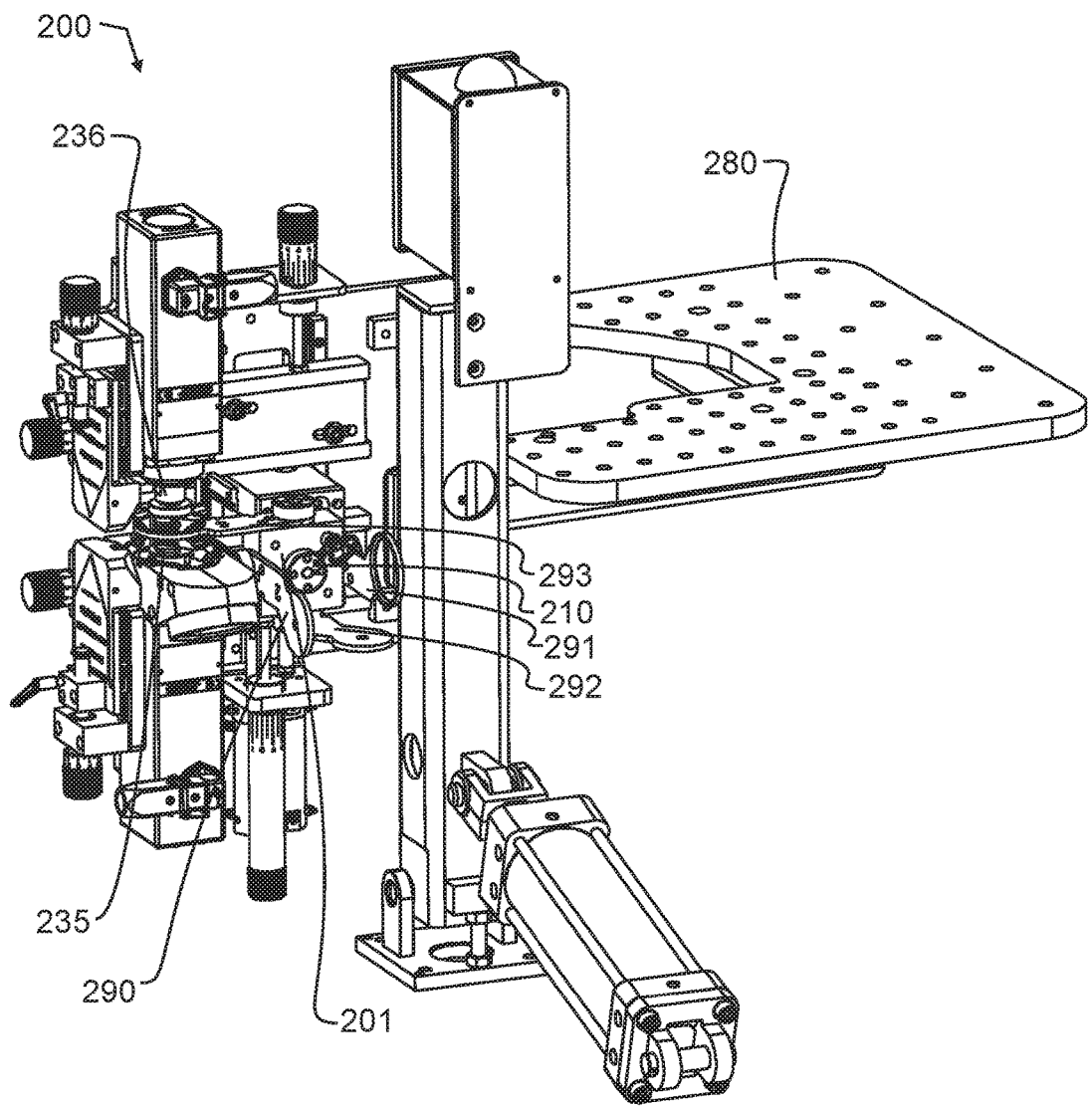
Figure 41:
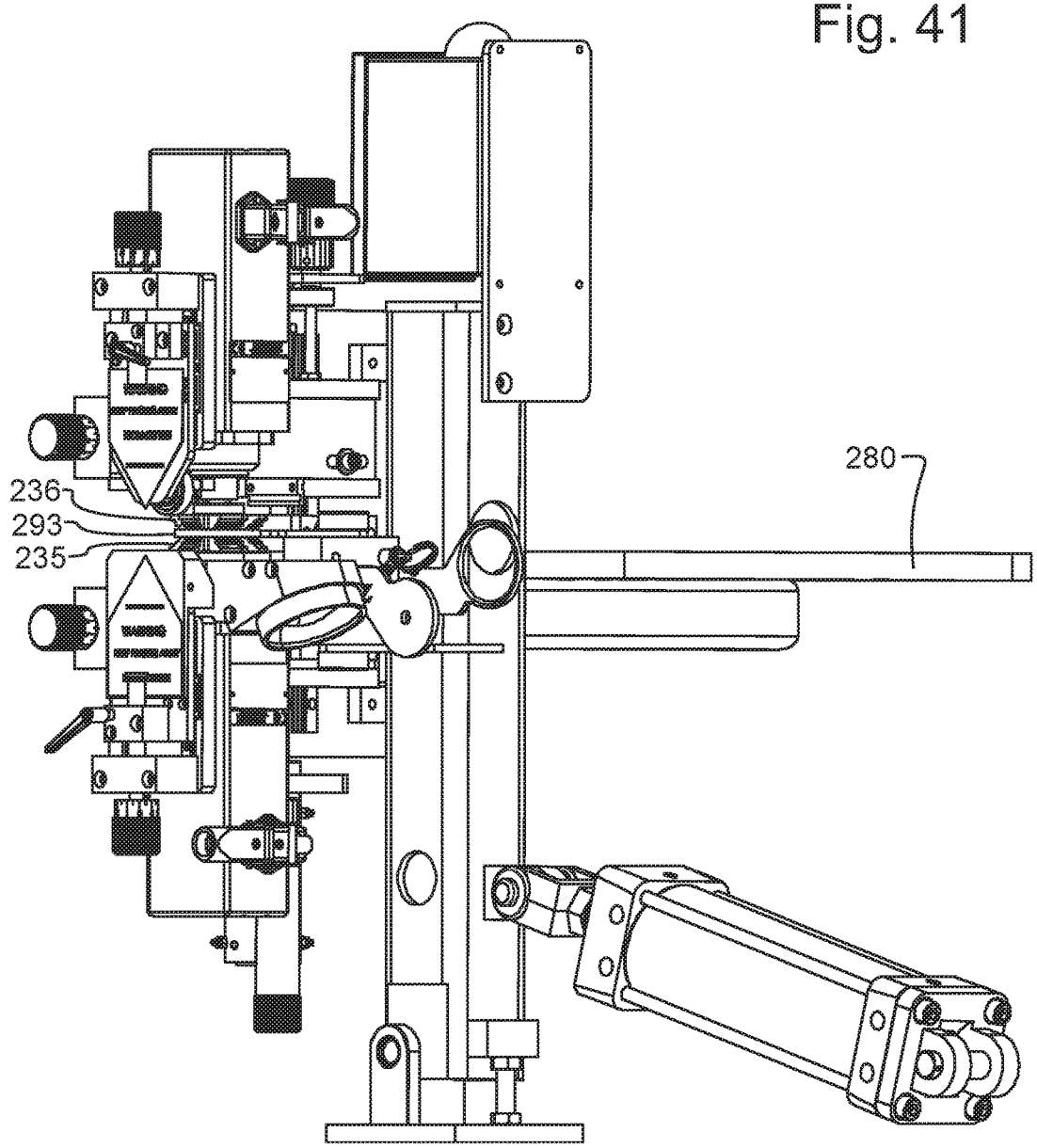

FIGS. 35-38 illustrate the preferred embodiment edge band application machine of FIG. 1 sectioned by horizontal plane at progressively lower elevation above the base, to offer further view and insight into the machine construction. In FIG. 37, edge band 15 and several banding guides have also been retained. FIGS. 36-38 provide excellent visibility of the combination of edging guides 130, 132, including the "L" shape of edging guide 130 providing bottom support, followed by edge banding guides 168, 169 that are also designed to provide bottom support for edge band 15. The combination of these various guides and the glue pot blade bottom 79 together help to enable the present invention to successfully process the half-millimeter edge banding, which has not heretofore been attained in an automated machine.

FIG. 37 also provides the most unobstructed view of serpentine belt 165, which transmits motive energy to all of the rotating shafts found within edging application cell 40. This single motive source ensures synchronicity throughout the cell 40, which is also necessary to successfully process thinner edge banding.

FIGS. 39-42 depict a preferred embodiment grinder 200. After edge band 15 has been applied to a work piece, the work piece may be placed on pivoting support surface 280, which is visible in the Figures pivoted to a position of inactivity. The lower trimmer blade 235 and the upper trimmer blade 236 are preferably angled in opposite directions in order to provide beveling to edge band 15. In order to ensure that the trimmer blades 235, 236 do not grind off portions of the work piece, and instead only grind edge band 15, guide plates 290-293 are provided in varying diameters. One of the four guide plates 290-293 will be pivoted in to the space between the lower trimmer blade 235 and the upper trimmer blade 236, to prevent the work piece from coming too close to the trimmer blades 235, 236. The guide plate mounting block 201 pivots about indexer hub 210 through ninety degree increments, and thereby allows one of the four guide plates 290-293 to be selected for varying the finished edge band thickness.

Trimmer blades 235, 236 generate substantial waste, and the effective removal of the scrap material is very important for efficient and reliable operation of grinder 200. In the preferred embodiment, a pair of dust collection vacuum manifolds 271, 272 are provided that are fabricated to have a cylindrical opening adjacent to and generally encompassing an associated cutter. If properly dimensioned and located, such as illustrated in FIG. 42 which shows both manifolds 271, 272 in place, then the motion of each trimmer blade will tend to create a spiral movement of air. The generally cylindrical internal shape of the manifolds 271, 272 facilitates this spiraling. Furthermore, when a vacuum is connected to manifolds 271, 272, the vacuum further assists in this very efficient and effective spiral air flow.

While not illustrated, it is further contemplated herein to incorporate a board drive assembly similar to board drive assembly 100 and caster wheel 163 into grinder 200, further reducing the need for manual intervention.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

We claim:

1. An automated edge band application machine configured to apply an edge band to an edge of a work piece, the automated edge band application machine comprising:
    a cutting assembly configured to sever said edge band;
    an adhesive applicator configured to apply adhesive to said edge band and create an adhesive edge band;
    a roller banding guide;
    a board drive assembly configured to frictionally engage said work piece and drive said workpiece edge into engagement with said roller banding guide, said adhesive edge band captured between said workpiece edge and said roller banding guide and thereby affixing said adhesive edge band to said work piece edge responsive to said capturing;

an edging detector located along a path of said work piece edge and in a position in advance of said rotating roller banding guide, said edging detector configured to detect a presence of edge band on said edge of said work piece and responsive thereto trigger said cutting assembly to sever said edge band.

2. The automated edge band application machine of claim 1, wherein said cutting assembly further comprises a cutter configured to sever said edge band at an angle offset from perpendicular to a longitudinal direction of travel of said edge band.

3. The automated edge band application machine of claim 1, wherein said edging detector further comprises a work piece follower that mechanically engages with said work piece and follows said work piece edge.

4. The automated edge band application machine of claim 1, wherein said board drive assembly further comprises a feed roller driven by a feed roller spindle, a splined shaft, a splined sleeve engaged with said splined shaft and locked against rotary motion relative to said splined shaft and translatable in a vertical direction, said board drive assembly thereby configured to automatically adjust to a varying thickness of said work piece, engage with a work piece major surface, and rotate to drive said work piece toward said roller banding guide.

5. The automated edge band application machine of claim 1, further comprising a caster wheel engaged with a second work piece major surface opposed to said board drive assembly.

6. The automated edge band application machine of claim 1, wherein said roller banding guide rotates and has a surface that moves at a rotational velocity matched to a velocity of said edge band and said work piece.

7. The automated edge band application machine of claim 1, further comprising:

an edge band trimmer having a first cutter and a second cutter spaced from and opposed to the first cutter, thereby defining a gap between the first and second cutters; and a turret having a plurality of rules affixed thereto, each of said plurality of rules pivotal with respect to said turret from a retracted position to a working position, said turret rotatable about a turret axis, and through rotation about said turret axis selecting a one of said plurality of rules pivotal into said gap between said first and second cutters.

8. The automated edge band application machine of claim 1, further comprising:

an edge band trimmer having a first cutter and a second cutter spaced from and opposed to the first cutter, thereby defining a gap between the first and second cutters; and a first dust collection manifold having a cylindrical opening adjacent to and generally encompassing said first cutter; and a second dust collection manifold having a cylindrical opening adjacent to and generally encompassing the second cutter.

9. The automated edge band application machine of claim 1, further comprising:

an edge band inlet configured to receive said edge band from a source spool;

a plurality of edging guides configured to guide said edge band along a longitudinal path;

a roller defining an axis of rotation and configured to pinch said edge band against an opposed surface defining a generally planar surface, said roller axis of rotation offset from parallel to said generally planar surface by an amount sufficient to bias said edge band into contact with said plurality of edging guides.

* * * * *